United States Patent
Kobayashi et al.

(10) Patent No.: US 10,491,868 B2
(45) Date of Patent: Nov. 26, 2019

(54) PROJECTION VIDEO DISPLAY APPARATUS

(71) Applicant: MAXELL, LTD., Kyoto (JP)

(72) Inventors: Shuhei Kobayashi, Kyoto (JP); Kazuo Shikita, Kyoto (JP); Akihiro Shiraishi, Kyoto (JP); Naoya Oka, Kyoto (JP)

(73) Assignee: Maxell, Ltd., Kyoto (JP)

(*) Notice: Subject to any disclaimer, the term of this patent is extended or adjusted under 35 U.S.C. 154(b) by 0 days.

(21) Appl. No.: 16/323,184

(22) PCT Filed: Aug. 5, 2016

(86) PCT No.: PCT/JP2016/073057
§ 371 (c)(1),
(2) Date: Feb. 4, 2019

(87) PCT Pub. No.: WO2018/025390
PCT Pub. Date: Feb. 8, 2018

(65) Prior Publication Data
US 2019/0191132 A1    Jun. 20, 2019

(51) Int. Cl.
*H04N 9/31* (2006.01)
*G09G 3/20* (2006.01)
(Continued)

(52) U.S. Cl.
CPC ......... *H04N 9/3155* (2013.01); *H04N 9/3164* (2013.01); *H04N 9/3182* (2013.01)

(58) Field of Classification Search
CPC .. H04N 9/3155; H04N 9/3182; H04N 9/3164; H04N 9/31; H04N 5/74; G09G 3/34; G09G 3/20
(Continued)

(56) References Cited

U.S. PATENT DOCUMENTS

| 2002/0063670 A1 | 5/2002 | Yoshinaga et al. |
| 2002/0135553 A1 | 9/2002 | Nagai et al. |

(Continued)

FOREIGN PATENT DOCUMENTS

| JP | 2002-229531 A | 8/2002 |
| JP | 2003-044016 A | 2/2003 |

(Continued)

OTHER PUBLICATIONS

International Search Report dated Nov. 1, 2016 for the PCT International Application No. PCT/JP2016/073057.

*Primary Examiner* — Jefferey F Harold
*Assistant Examiner* — Mustafizur Rahman
(74) *Attorney, Agent, or Firm* — Volpe and Koenig, P.C.

(57) ABSTRACT

A projection video display apparatus includes an input unit to input a video signal; a display to display the inputted video signal; a plurality of light sources to generate light; an illumination optical system to guide the generated light to the display; a projection optical system to project light via the display; and a controller to control the light sources, a lighting ratio and a current value per time for each light source. The controller has a black display control mode, for each light source, which makes a relative rate of a lighting ratio for a light source with a specific color smaller than the other light sources, and reduces the current value of the other light sources to be less than a current value of the light source with the specific color when compared with a case where the input video signal is a white signal.

10 Claims, 16 Drawing Sheets

(51) Int. Cl.
*G09G 3/34* (2006.01)
*H04N 5/74* (2006.01)

(58) Field of Classification Search
USPC ............ 348/744, 739; 345/89, 87, 102, 690
See application file for complete search history.

(56) References Cited

U.S. PATENT DOCUMENTS

| | | | | |
|---|---|---|---|---|
| 2005/0057542 A1* | 3/2005 | Plut | ...................... | H04N 9/3141 |
| | | | | 345/204 |
| 2006/0176323 A1* | 8/2006 | Bommersbach | ..... | H04N 9/3114 |
| | | | | 345/697 |
| 2006/0256093 A1* | 11/2006 | Furukawa | ............. | G06F 3/0412 |
| | | | | 345/173 |
| 2007/0164945 A1* | 7/2007 | Jung | .................... | G09G 3/3413 |
| | | | | 345/84 |
| 2008/0088560 A1* | 4/2008 | Bae | ...................... | G09G 3/2025 |
| | | | | 345/90 |
| 2010/0309293 A1* | 12/2010 | Plut | ...................... | H04N 9/3147 |
| | | | | 348/51 |
| 2012/0293565 A1 | 11/2012 | Mito | | |
| 2015/0286123 A1* | 10/2015 | Tanaka | ............... | G03B 21/2053 |
| | | | | 353/31 |
| 2016/0025327 A1* | 1/2016 | Abe | ...................... | G03B 21/204 |
| | | | | 348/744 |
| 2017/0127025 A1* | 5/2017 | Damberg | ............... | G02B 26/06 |
| 2018/0197493 A1* | 7/2018 | Yamakawa | ............ | B60K 35/00 |

FOREIGN PATENT DOCUMENTS

| | | |
|---|---|---|
| JP | 2007-163988 A | 6/2007 |
| JP | 2007-292823 A | 11/2007 |
| JP | 2012-242672 A | 12/2012 |
| JP | 2012-247630 A | 12/2012 |
| JP | 2013-088480 A | 5/2013 |
| WO | 01/69584 A1 | 9/2001 |

* cited by examiner

FIG. 8

| FIRST CONTROL EXAMPLE | INPUT SIGNAL | |
|---|---|---|
| | WHITE SIGNAL | BLACK SIGNAL |
| OSD OFF | TENTH LIGHT SOURCE CONTROL STATE | FIRST LIGHT SOURCE CONTROL STATE |
| OSD ON | TENTH LIGHT SOURCE CONTROL STATE | TENTH LIGHT SOURCE CONTROL STATE |

| SECOND CONTROL EXAMPLE | INPUT SIGNAL | |
|---|---|---|
| | WHITE SIGNAL | BLACK SIGNAL |
| OSD OFF | TENTH LIGHT SOURCE CONTROL STATE | FIRST LIGHT SOURCE CONTROL STATE |
| OSD ON | TENTH LIGHT SOURCE CONTROL STATE | FIFTH LIGHT SOURCE CONTROL STATE |

FIG. 9

| THIRD CONTROL EXAMPLE | INPUT SIGNAL ||||
|---|---|---|---|---|
| | WHITE SIGNAL | FIRST INTERMEDIATE LUMINANCE SIGNAL | SECOND INTERMEDIATE LUMINANCE SIGNAL | BLACK SIGNAL |
| OSD OFF | TENTH LIGHT SOURCE CONTROL STATE | SEVENTH LIGHT SOURCE CONTROL STATE | THIRD LIGHT SOURCE CONTROL STATE | FIRST LIGHT SOURCE CONTROL STATE |
| OSD ON | TENTH LIGHT SOURCE CONTROL STATE | TENTH LIGHT SOURCE CONTROL STATE | TENTH LIGHT SOURCE CONTROL STATE | TENTH LIGHT SOURCE CONTROL STATE |

| FOURTH CONTROL EXAMPLE | INPUT SIGNAL ||||
|---|---|---|---|---|
| | WHITE SIGNAL | FIRST INTERMEDIATE LUMINANCE SIGNAL | SECOND INTERMEDIATE LUMINANCE SIGNAL | BLACK SIGNAL |
| OSD OFF | TENTH LIGHT SOURCE CONTROL STATE | SEVENTH LIGHT SOURCE CONTROL STATE | THIRD LIGHT SOURCE CONTROL STATE | FIRST LIGHT SOURCE CONTROL STATE |
| OSD ON | TENTH LIGHT SOURCE CONTROL STATE | SEVENTH LIGHT SOURCE CONTROL STATE | SEVENTH LIGHT SOURCE CONTROL STATE | SEVENTH LIGHT SOURCE CONTROL STATE |

| FIFTH CONTROL EXAMPLE | INPUT SIGNAL ||||
|---|---|---|---|---|
| | WHITE SIGNAL | FIRST INTERMEDIATE LUMINANCE SIGNAL | SECOND INTERMEDIATE LUMINANCE SIGNAL | BLACK SIGNAL |
| OSD OFF | TENTH LIGHT SOURCE CONTROL STATE | SEVENTH LIGHT SOURCE CONTROL STATE | THIRD LIGHT SOURCE CONTROL STATE | FIRST LIGHT SOURCE CONTROL STATE |
| OSD ON | TENTH LIGHT SOURCE CONTROL STATE | NINTH LIGHT SOURCE CONTROL STATE | SIXTH LIGHT SOURCE CONTROL STATE | FOURTH LIGHT SOURCE CONTROL STATE |

| SIXTH CONTROL EXAMPLE | INPUT SIGNAL ||||
|---|---|---|---|---|
| | WHITE SIGNAL | FIRST INTERMEDIATE LUMINANCE SIGNAL | SECOND INTERMEDIATE LUMINANCE SIGNAL | BLACK SIGNAL |
| OSD OFF | TENTH LIGHT SOURCE CONTROL STATE | SEVENTH LIGHT SOURCE CONTROL STATE | THIRD LIGHT SOURCE CONTROL STATE | FIRST LIGHT SOURCE CONTROL STATE |
| OSD ON | TENTH LIGHT SOURCE CONTROL STATE | TENTH LIGHT SOURCE CONTROL STATE | SEVENTH LIGHT SOURCE CONTROL STATE | THIRD LIGHT SOURCE CONTROL STATE |

FIG. 11
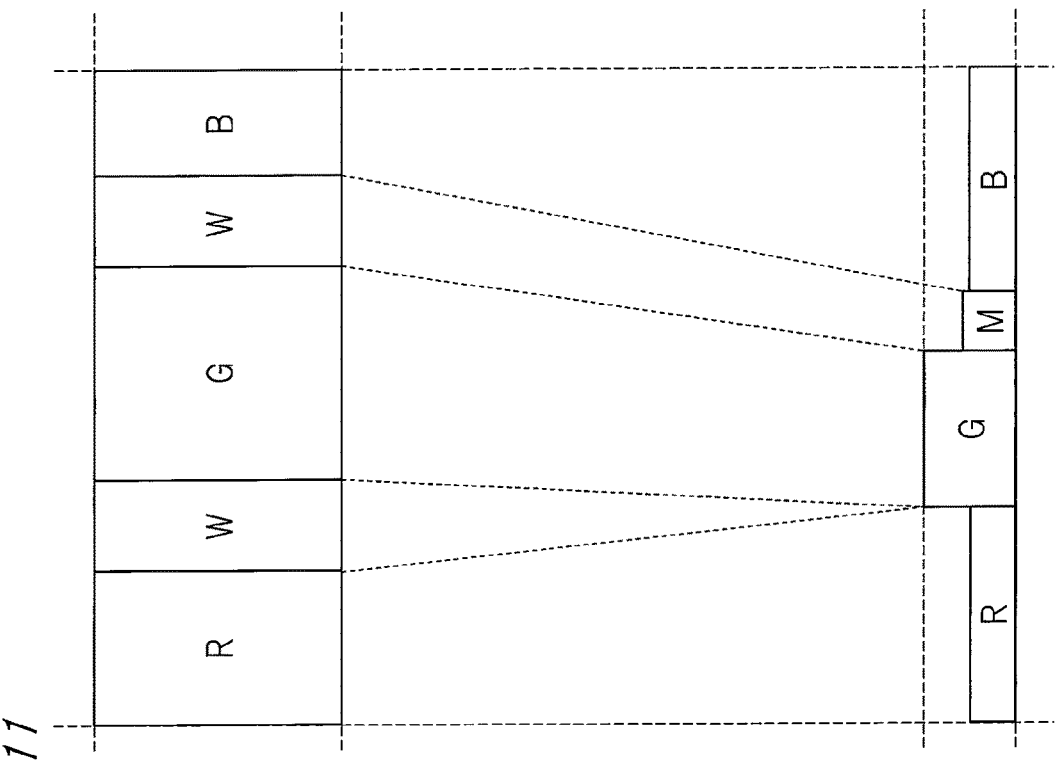
(A) 
(B) 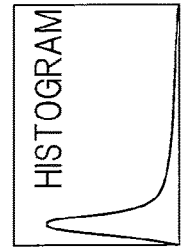
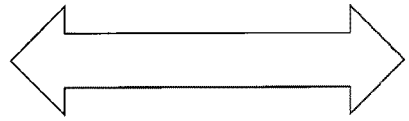

PROJECTION VIDEO DISPLAY APPARATUS

TECHNICAL FIELD

The present invention relates to a projection video display apparatus, and particularly, the present invention relates to an effective technique to be applied to a projection video display apparatus that utilizes a plurality of independently controlled light sources.

BACKGROUND ART

In a projection video display apparatus (hereinafter, which may be referred to as a "projector") that projects video onto a screen or the like, an LED (Light Emitting Diode) light source has been used in recent years. In this case, for example, light sources for three colors of red (R), green (G), and blue (B) are independently provided.

For example, Patent document 1 describes a projector in which a light source is constituted by a light emitting device such as an LED for each color component of RGB.

RELATED ART DOCUMENTS

Patent Documents

Patent document 1: Japanese Patent Application Publication No. 2007-292823

SUMMARY OF THE INVENTION

Problems to be Solved by the Invention

In Patent document 1 described above, in order to suppress power consumption of the light source without deteriorating contrast of video to be projected, an example of adjusting an amount of luminescence of the light emitting device of each color of RGB by supplied electric power and an example of adjusting the amount of luminescence by lighting ratios within a unit of time are described separately. However, Patent document 1 does not describe that the amount of luminescence is to be adjusted more highly.

It is thus an object of the present invention to provide a technique to more highly adjust an amount of luminescence of each of a plurality of light sources controlled independently in a projection video display apparatus that uses the plurality of light sources controlled independently.

The foregoing and other objects, and new features of the present invention will become more apparent from the detailed description of the present specification and the appending drawings.

Means for Solving the Problem

An outline of representative invention of the present invention disclosed in the present application will briefly be explained as follows.

A projection video display apparatus according to one embodiment is a projection video display apparatus including: an input unit to which an input video signal is inputted; a display element configured to display video on a basis of the input video signal inputted by the input unit; a plurality of light sources; an illumination optical system configured to guide light generated by the plurality of light sources to the display element; a projection optical system configured to project light via the display element; and a controller configured to control the plurality of light sources, wherein the controller is configured to control a lighting ratio and a current value per unit time of each of the plurality of light sources to change, and wherein as a light source control mode for each of the plurality of light sources by the controller, a black display light source control mode is provided in which a control is executed to make a relative rate of a lighting ratio per unit time for a light source with a specific color smaller than those for the other light sources and reduce a current value of each of the other light sources more greatly than a current value of the light source with the specific color in a case where the input video signal is a black signal compared with a case where the input video signal is a white signal.

Effects of the Invention

Effects obtained by representative invention of the present invention disclosed in the present application will briefly be explained as follows.

According to one embodiment, it becomes possible to adjust an amount of luminescence of each of a plurality of light sources controlled independently more highly.

BRIEF DESCRIPTIONS OF THE DRAWINGS

FIG. 8 is a view illustrating light source control states of the control example of the light sources according to the fifth embodiment of the present invention;

FIG. 9 is a view illustrating light source control states of the control example of the light sources according to the fifth embodiment of the present invention;

FIG. 11 is a view illustrating an outline of the control example of the light sources according to the sixth embodiment of the present invention;

DETAILED DESCRIPTION OF PREFERRED EMBODIMENTS

Figure 1:
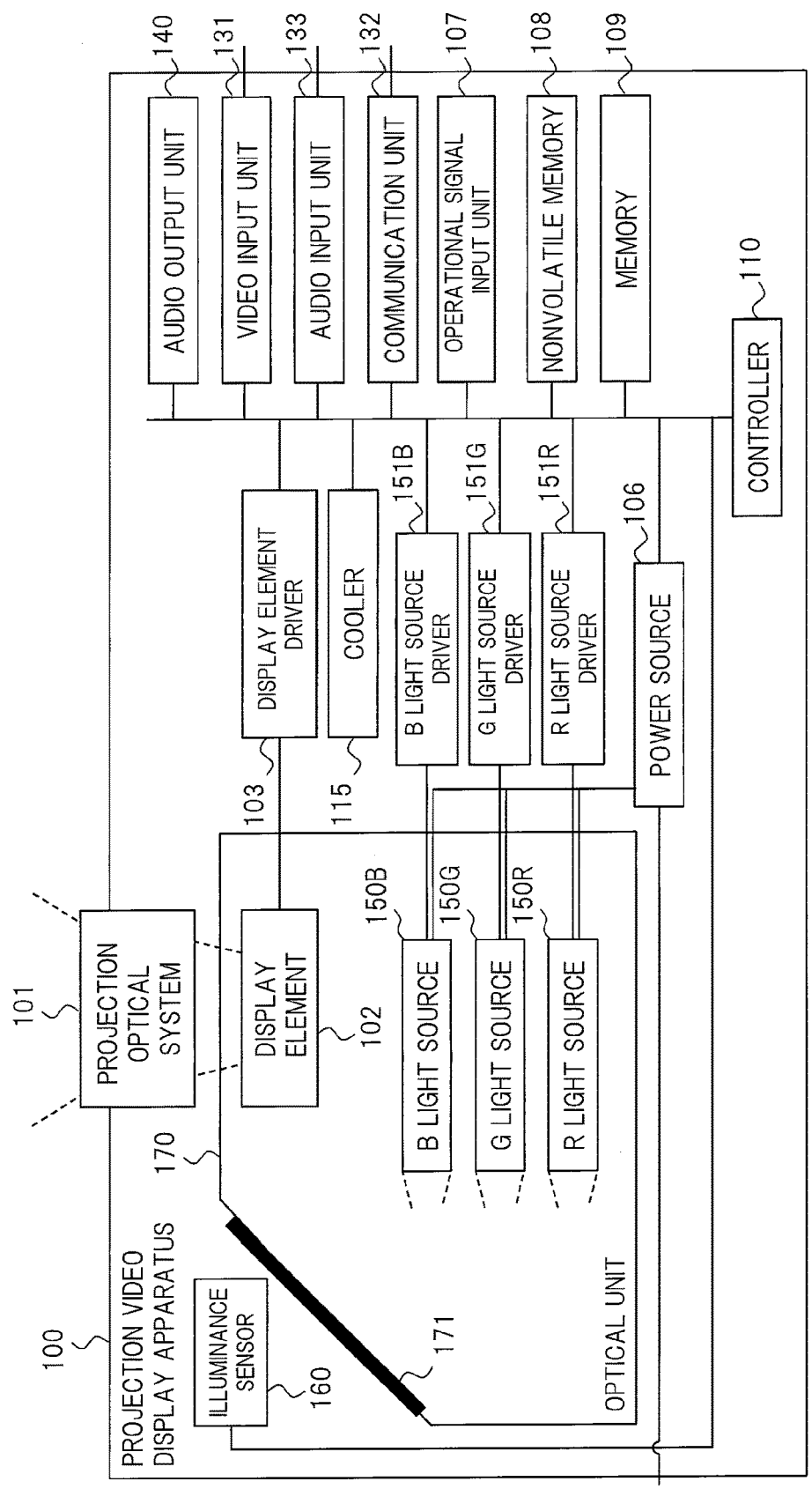
FIG. 1 is a view illustrating an outline of a configuration example of a projection video display apparatus according to a first embodiment of the present invention.

In embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Further, in the embodiments described below, in a case of referring to the number of elements (including number of pieces, values, amount, range, and the like), the number of the elements is not limited to a specific number unless otherwise stated or except the case where the number is apparently limited to a specific number in principle, and the number larger or smaller than the specified number may also be applicable.

Moreover, in the embodiments described below, it goes without saying that the components (including element steps and the like) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, the embodiment will be described in detail with reference to the drawings. Note that the same components are in principle denoted by the same reference numeral throughout the drawings for describing the embodiments and the repetitive description thereof will be omitted. On the other hand, a component has been explained in a certain drawing while applying a reference numeral thereto is not illustrated again when another drawing is to be explained, but the element may be referred to by applying the same reference numeral thereto.

First Embodiment

A projection video display apparatus according to a first embodiment will be described with reference to FIG. 1 to FIG. 3.

<Apparatus Configuration (The Whole)>

FIG. 1 is a view illustrating an outline of a configuration example of the projection video display apparatus according to the present first embodiment. A projection video display apparatus 100 is a projector provided with a projection optical system 101 and an optical unit 170 as an optical system, for example, and is implemented as a DLP (Digital Light Processing) (registered trademark) projector or the like. The projection optical system 101 is an optical system configured to project video onto a screen or the like, and includes lenses and/or mirrors (not illustrated in the drawings). The optical unit 170 is an illumination optical system configured to generate illumination light entering the projection optical system 101, and includes, as components, a display element 102, and an R (red) light source 150R, a G (green) light source 150G and a B (blue) light source 150B, which are light sources controlled independently (hereinafter, these may be referred to as "light sources 150"), for example.

The display element 102 is an element configured to generate video to be projected. A transmissive liquid crystal panel, a reflective liquid crystal panel, a DMD (Digital Micromirror Device) (registered trademark, the same applies hereinafter) panel, or the like can be used as the display element 102, for example. In the present embodiment, a case where a DMD panel is used will be described. The display element 102 receives a driving signal based on a video signal from a display element driver 103, and generates video to be projected on the basis of this. Each of the light sources 150 is constructed by an LED light source configured to receive supply of electric power from a power source 106 to emit illumination light with a target color (RGB). Emission of the light sources 150 is respectively controlled by drivers corresponding to the colors (including an R light source driver 151R, a G light source driver 151G, and a B light source driver 151B (hereinafter, these may be referred to as "light source drivers 151")).

In the present embodiment, lighting ratios and current values per unit of the light sources 150 with the respective colors are changed in the optical unit 170. A control to change these is executed by a controller 110 (will be described later). Further, in the optical unit 170, irradiation lights emitted from the light sources 150 with three colors are reflected by a mirror 171, and enter the display element 102. The mirror 171 has a high degree of reflection, but secures a little transmission factor. The illumination light based on the above transmission factor is transmissive to a back side of the mirror 171. An illuminance sensor 160 installed on a back surface of the mirror 171 measures light quantity of each of the colors of the transmitted light that transmits the mirror 171 to feed them back to the controller 110. The controller 110 can separately adjust an output of each of the light sources 150 via the corresponding light source driver 151.

The projection video display apparatus 100 further includes each unit of the power source 106, an operational signal input unit 107, a nonvolatile memory 108, a memory 109, the controller 110, a cooler 115, a video input unit 131, a communication unit 132, an audio input unit 133, an audio output unit 140 and the like.

The power source 106 receives supply of electric power from an external power source (not illustrated in the drawings), and supplies the electric power for operation to each of units including the light sources 150. The operational signal input unit 107 is an input interface through which a user carries out an operation to the projection video display apparatus 100. For example, the operational signal input unit 107 is constructed by an operation button provided on a body of the projection video display apparatus 100 or a light receiver for a remote controller (not illustrated in the drawings), and receives an input of an operational signal from the user.

The nonvolatile memory 108 is configured by a nonvolatile memory such as a flash memory, for example. The nonvolatile memory 108 holds various kinds of setting information related to the projection video display apparatus 100, and the like. In the present embodiment, the nonvolatile memory 108 may hold various kinds of parameters for executing a control to change each of the lighting ratio and the current value per unit of each of the light sources 150 with the respective colors. The memory 109 is configured by a volatile memory such as a DRAM (Dynamic Random Access Memory) or the like. The memory 109 buffers video data of a projection target, which are inputted via the video input unit 131 (will be described later) or the like, or develops and holds data for various kinds of controls related to the projection video display apparatus 100.

The cooler 115 is configured by a fan or the like configured to release heat generated from the light sources 150 to the outside for suppressing rise in temperature. The video input unit 131 and the audio input unit 133 input video data and/or audio data as a projection target or output target from an information processing apparatus or the like (not illustrated in the drawings) connected via an external interface. The inputted video data and/or audio data may be buffered in the memory 109. The communication unit 132 has a function to carry out communication with an external apparatus such as an information processing apparatus (not illustrated in the drawings) to input and output various kinds of control signals and the like. The communication unit 132 may have a network interface for the Internet or a LAN (Local Area Network). The audio output unit 140 includes a speaker, an external output terminal, and the like (not illustrated in the drawings). The audio output unit 140 outputs audio information related to displayed video, and outputs a notification sound or a warning sound related to an operation, an error and the like of the projection video display apparatus 100, and audio information.

The controller 110 controls an operation of each unit in the projection video display apparatus 100. In particular, in the present embodiment, the controller 110 executes a control to change each of the lighting ratio and the current value per unit of each of the light sources 150 for respective colors (including an R light source 150R, a G light source 150G, and a B light source 150B), whereby it is possible to improve contrast of the video to be projected and adjust a tone or shade of colors of the video. In order to execute the control to change each of the lighting ratio and the current value per unit of each of the light sources 150, for example, various kinds of light source control modes including a black display light source control mode (that is, a light source control mode for displaying black) and a white display light source control mode (that is, a light source control mode for displaying white) are provided. Details of the various kinds of light source control modes by the controller 110 will be described later.

<Apparatus Configuration (Optical System)>

Figure 2:
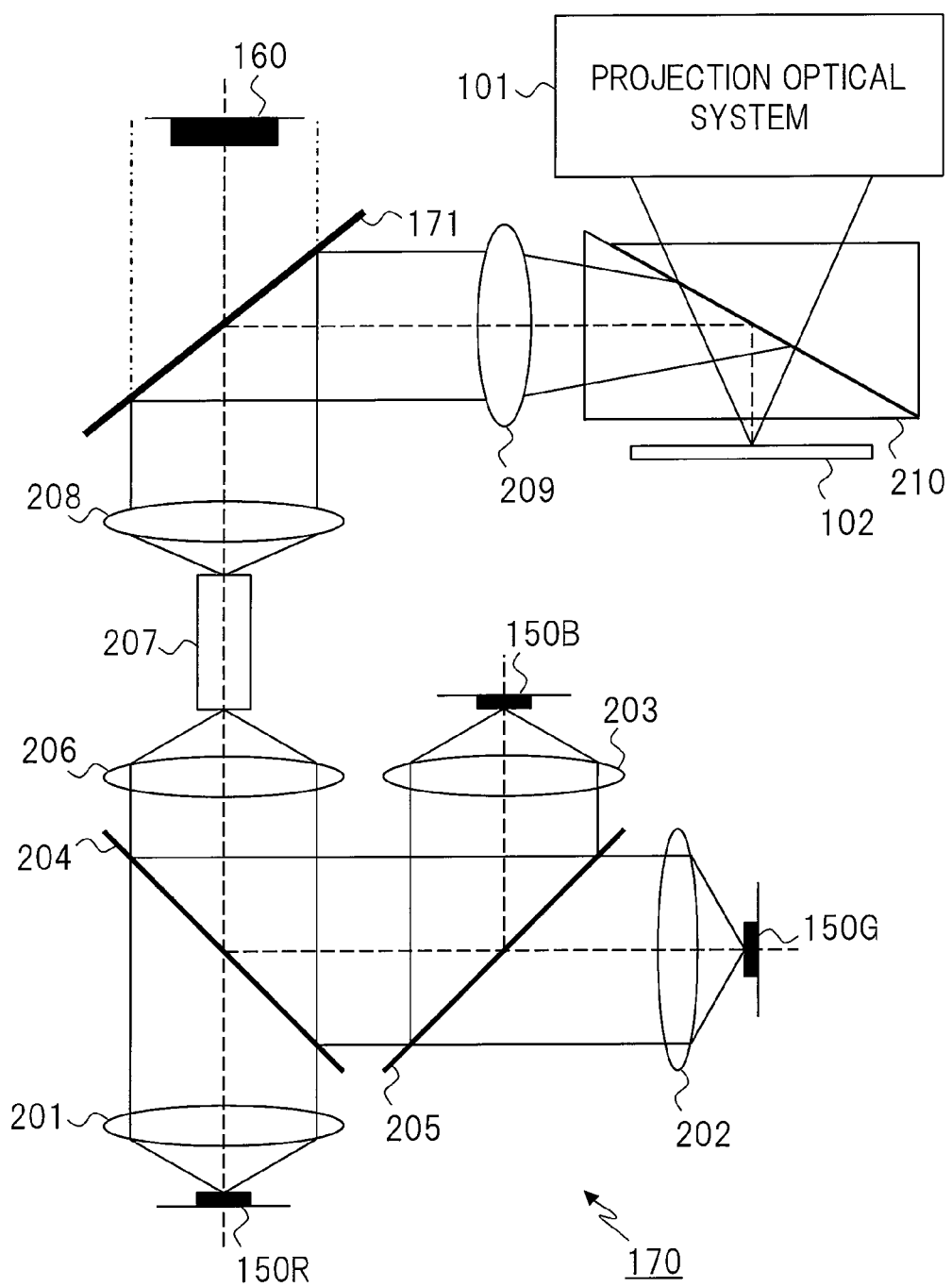
FIG. 2 is a view illustrating an outline of a configuration example of an optical unit according to the first embodiment of the present invention.

FIG. 2 is a view illustrating an outline of a configuration example of the optical unit 170 according to the present first embodiment. In the optical unit 170, the irradiation lights with the respective colors, which are emitted from the light sources 150 with the three colors including the R light source 150R, the G light source 150G, and the B light source 150B that are respectively arranged at different positions and diffused, are caused to become illumination light flux by corresponding relay lenses 201, 202, and 203. These optical paths for the light flux are synthesized by color synthesis mirrors (dichroic mirrors) 204 and 205, whereby an optical path on which the optical paths for the irradiation light flux of the respective colors is superimposed is generated. In the example of FIG. 2, the optical path for the irradiation light from the G light source 150G and the optical path for the irradiation light from the B light source 150B are synthesized by the color synthesis mirror 205, and the synthesized optical path and the optical path for the irradiation light from the R light source 150R are further synthesized by the color synthesis mirror 204.

The illumination light flux of the optical path after synthesis by the color synthesis mirror 204 enters a rod integrator 207 through a relay lens 206, whereby illuminance distribution thereof is uniformized. The illumination light flux is then taken out via a relay lens 208. This illumination light flux is reflected by the mirror 171, and then enters a TIR (Total Internal Reflection) prism 210 through a relay lens 209. The illumination light flux is totally reflected by the inside of the TIR prism 210, and is irradiated to the display element 102 (a DMD panel in the present embodiment) on which the video to be projected is generated. Light reflected by the display element 102 is then transmissive to the TIR prism 210 to enter the projection optical system 101, whereby video is projected on a screen or the like (not illustrated in the drawings) by the projection optical system 101.

<Control for Light Sources>

Figure 3:
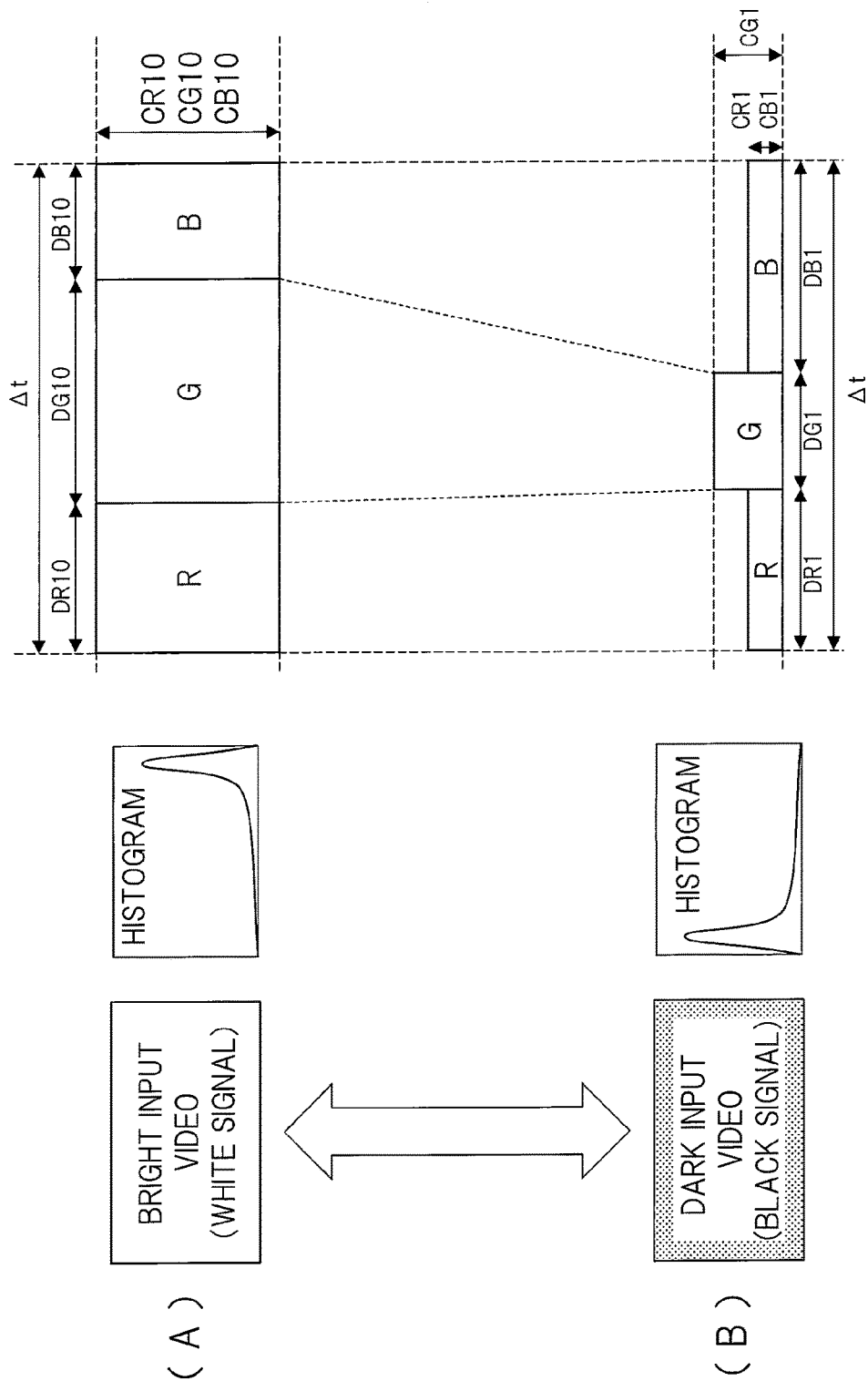
FIG. 3 is a view illustrating an outline of a control example of light sources according to the first embodiment of the present invention.

FIG. 3 is a view illustrating an outline of a control example of the light sources 150 according to the present first embodiment. The projection video display apparatus 100 according to the present embodiment is a projection video display apparatus that can respectively control a plurality of light sources 150 (the R (red) light source 150R, the G (green) light source 150G, the B (blue) light source 150B) to change a lighting ratio and a current value per unit time. This projection video display apparatus 100 has a black display light source control mode. In the black display light source control mode, a control is executed in which in a case where an input signal is a black signal, a relative rate of a lighting ratio per unit time for a light source with a specific color is made smaller than those of the other light sources and a current value of each of the other light sources is reduced more greatly than a current value of the light source with the specific color compared with a case where the input signal is a white signal.

In the example of FIG. 3, the light source with the specific color is the G light source 150G, and the other light sources are the R light source 150R and the B light source 150B. FIG. 3 illustrates a control example of the white display light source control mode at an upper stage (FIG. 3(A)), and a control example of the black display light source control mode at a lower stage (FIG. 3(B)). In the black display light source control mode of the example of FIG. 3(B), a control is executed to make the relative rate of the lighting ratio per unit time for the G light source 150G smaller than those for the R light source 150R and the B light source 150B and reduce current values of the R light source 150R and the B light source 150B more greatly than a current value of the G light source 150G.

In the control for the light sources 150 according to the present embodiment, in a case where relatively bright input video (white signal) or relatively dark input video (black signal) is inputted, the controller 110 detects brightness of the inputted video, and outputs, in accordance with this detected brightness of the inputted video, a driving signal to cause the light source drivers 151 to respectively control the lighting ratio and the current value per unit of the light sources 150, thereby adjusting light quantity and a tone or shade of colors of the illumination light irradiated to the display element 102. Light quantity and a tone or shade of colors of video projected onto the screen change on the basis of adjustment of the light quantity and the tone or shade of colors of the illumination light.

The adjustment of the illumination light irradiated onto the display element 102 is executed at timing when input video is inputted, for example. In this case, the adjustment may be executed for every frame of the input video, or the adjustment may be executed for a plurality of frames as a unit. Further, levels of white and black of the input video may be tracked, and the adjustment may be executed several times during this tracking by switching the lighting ratio and the current value per unit.

As illustrated in FIG. 3, in a case where bright input video (white signal), dark input video (black signal), or the like is inputted as the input signal, brightness of the input video is first detected. The controller 110 detects the brightness of the input video by means of a histogram, an APL (Average Picture Level), peak level, or the like, for example. FIG. 3 illustrates an example in which a histogram of input video is detected.

The histogram indicates distribution of the brightness of the video. For example, in a histogram in which a horizontal axis denotes brightness and a vertical axis denotes the number of pixels, the number of pixels is unevenly distributed to greater brightness in a case of the bright input video, and the number of pixels is unevenly distributed to smaller brightness in a case of the dark input video. By identifying to which the number of pixels is unevenly distributed in this histogram, it is possible to detect the bright input video or the dark input video.

The APL indicates an average value of the brightness of the video. For example, in a case of the bright input video, the APL becomes larger. In a case of the dark input video, the APL becomes smaller. By identifying the magnitude of this APL, it is possible to detect the bright input video or the dark input video.

The peak level indicates the maximum value of the brightness of the video. For example, the peak level becomes larger in a case of the bright input video, and the peak level becomes smaller in a case of the dark input video. By identifying the magnitude of this peak level, it is possible to detect the bright input video or the dark input video.

Then, the lighting ratio per unit time of the brightest light source is adjusted in accordance with a result obtained by detecting the brightness of the input video, and adjustment is executed at the current value of each light source so that the tone or shade of colors is not greatly broken. In the example of FIG. 3, compared with the case of the bright input video, in a case of the dark input video, the lighting ratio per unit time of the brightest G light source 150G is reduced, and the lighting ratios per unit time of the R light source 150R and the B light source 150B that are the other light sources are increased. In addition, the absolute value of the current value of the G light source 150G is reduced, but the current values of the R light source 150R and the B light source 150B that are the other light sources are set to a relatively smaller state than the current value of the G light source 150G whose current value is relatively greater than the current values of the R light source 150R and the B light source 150B. In this manner, in a case of the dark input video, it is possible to set to a state where the tone or shade of colors is not greatly broken while keeping an amount of luminescence of the light source to be smaller as much as possible.

In the example of FIG. 3, the lighting ratios per a unit of time (Δt) of the R light source 150R, the G light source 150G and the B light source 150B are respectively set to DR (that is, the R light source), DG (that is, the G light source), and DB (that is, the B light source). Further, the current values of the R light source 150R, the G light source 150G and the B light source 150B are respectively set to CR (R light source), CG (G light source), and CB (B light source). Further, a numeral (any of 10 to 1) corresponding to each light source control state among tenth to first light source control states is applied to each of the lighting ratios per unit time DR, DG, and DB, and the current values CR, CG, and CB, and is indicated.

Here, the unit of time (Δt) corresponds to one frame of the input video, for example. In the light source control state of each of the R light source 150R, the G light source 150G and the B light source 150B, a control to cause the R light source 150R, the G light source 150G and the B light source 150B to emit with the corresponding lighting ratios and current values in a time-division manner in order determined in one frame is executed.

As illustrated in FIG. 3, for example, in a case where bright input video (white signal) is inputted, a lighting ratio per the unit of time (Δt) is set to a relationship of DG10>DR10>DB10. The current values in this case are set to a relationship of CR10=CG10=CB10. In this case, it becomes the tenth light source control state.

In a case where dark input video (black signal) is inputted, the lighting ratios per the unit of time (Δt) are set to a relationship of DB1>DR1>DG1. The current values in this case are set to a relationship of CG1>CR1=CB1. In this case, it becomes the first light source control state.

As explained above, according to the projection video display apparatus 100 of the present embodiment, the black display light source control mode in which the control is executed to make the relative rate of the lighting ratio per unit time for the G light source 150G smaller than those of the R light source 150R and the B light source 150B and reduce the current values of the R light source 150R and the B light source 150B more greatly than the current value of the G light source 150G in a case where the input signal is a black signal compared with the case where the input signal is the white signal. This makes it possible to suitably keep the tone or shade of colors of the video display based on the black signal while making the dark input video (black signal) darker. Namely, it is possible to suitably keep the tone or shade of colors of the video display based on the black signal while improving contrast of the video that indicates a ratio of the bright input video (white signal) and the dark input video (black signal).

Second Embodiment

A basic configuration, a control method, and the like of a projection video display apparatus 100 according to a second embodiment are similar to those of the projection video display apparatus 100 according to the first embodiment described above. However, a control for light sources 150 is different from each other. Hereinafter, this difference will be described mainly with reference to FIG. 4.

Figure 4:
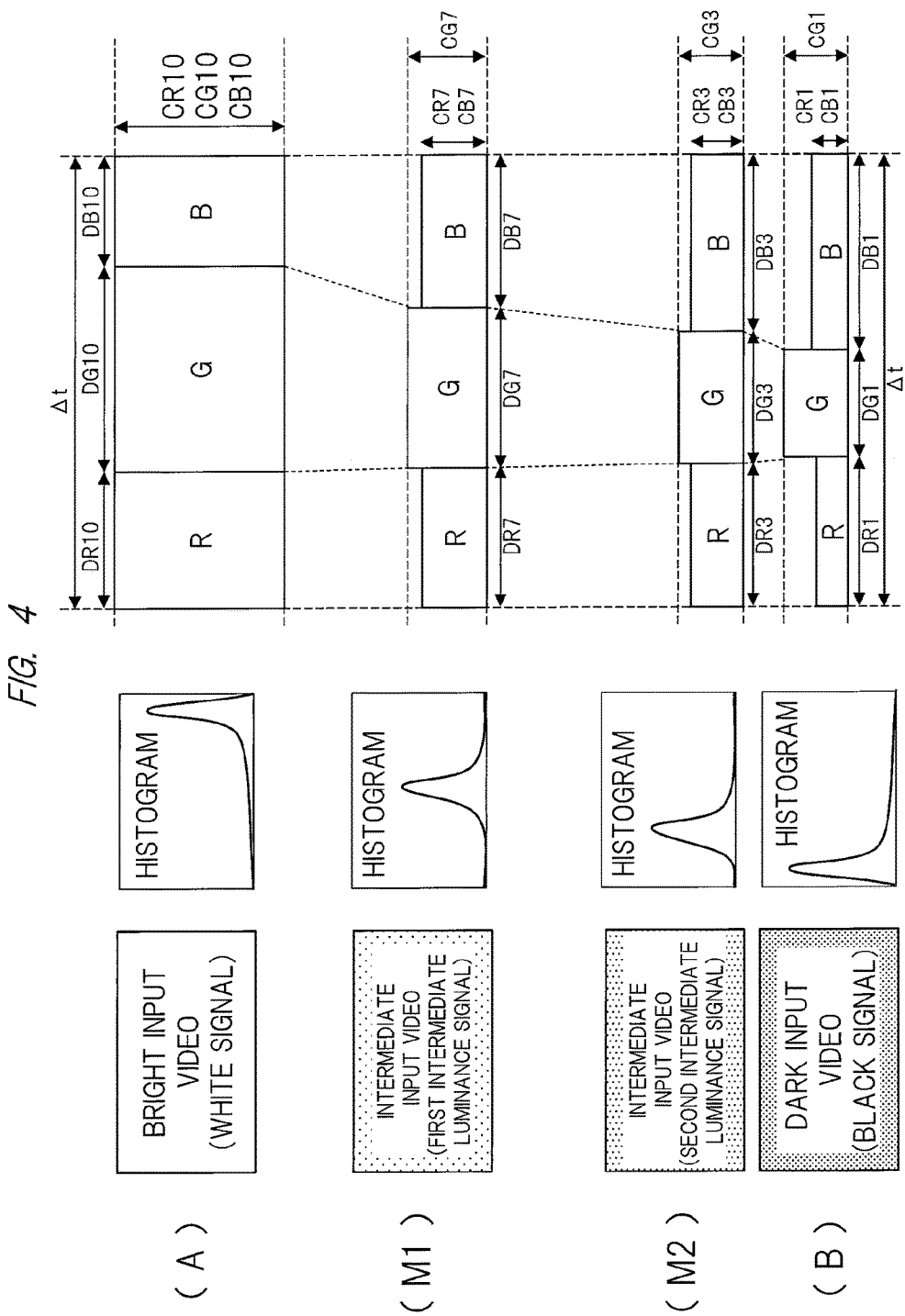
FIG. 4 is a view illustrating an outline of a control example of light sources according to a second embodiment of the present invention.

FIG. 4 is a view illustrating an outline of a control example of the light sources 150 according to the present second embodiment. FIG. 4 illustrates: a control example (FIG. 4(A)) of a white display light source control mode similar to that in FIG. 3(A) at an uppermost stage; a control example (FIG. 4(M1)) in a case where intermediate input video (a first intermediate luminance signal) is inputted at a next stage; a control example (FIG. 4 (M2)) in a case where intermediate input video (a second intermediate luminance signal) is inputted at a further next stage; and a control example (FIG. 4(B)) of a black display light source control mode similar to that in FIG. 3(B) at the lowermost stage. Namely, the control for the light sources 150 according to the present embodiment is an example in which the control example (FIG. 4 (M1)) in a case where the intermediate input video (first intermediate luminance signal) is inputted and the control example (FIG. 4 (M2)) in a case where the intermediate input video (second intermediate luminance signal) is inputted are added into the example according to the first embodiment (FIG. 3) described above.

Namely, the projection video display apparatus 100 according to the present embodiment can set lighting ratios and current values per unit time in a stepwise manner in response from a case where an input signal is a white signal to a case where the input signal is a black signal. In the black display light source control mode, a control is executed to make a relative rate of a lighting ratio per unit time for a G light source 150G smaller than those of an R light source 150R and a B light source 150B and reduce current values of the R light source 150R and the B light source 150B more greatly than a current value of the G light source 150G in a stepwise manner.

In the control for the light sources 150 according to the present embodiment, in a case where relatively bright input video (white signal), intermediate input video (a first intermediate luminance signal), intermediate input video (a second intermediate luminance signal), dark input video (black signal), or the like is inputted, the controller 110 detects brightness of the input video, and outputs, in accordance with this detected brightness of the inputted video, a driving signal to cause light source drivers 151 to respectively control the lighting ratio and the current value per unit of the light sources 150, thereby adjusting contrast of the video to be projected onto a screen or the like.

As illustrated in FIG. 4, for example, in a case where the bright input video (white signal) is inputted, a light source control state is the same as a tenth light source control state (DG10>DR10>DB10, CR10=CG10=CB10) according to the first embodiment described above.

In a case where the intermediate input video (the first intermediate luminance signal) is inputted, lighting ratios per a unit of time (Δt) are set to a relationship of DG7>DB7>DR7. The current values in this case are set to a relationship of CG7>CR7=CB7. In this case, it becomes a seventh light source control state.

In a case where the intermediate input video (the second intermediate luminance signal) is inputted, lighting ratios per a unit of time (Δt) are set to a relationship of DB3>DR3>DG3. Current values in this case are set to a relationship of CG3>CR3=CB3. In this case, it becomes a third light source control state.

In a case where the dark input video (black signal) is inputted, it becomes the same as the first light source control state according to the first embodiment described above (DB1>DR1>DG1, CG1>CR1=CB1).

As explained above, according to the projection video display apparatus 100 of the present embodiment, in a case where the bright input video (white signal), the intermediate input video (the first intermediate luminance signal), the intermediate input video (the second intermediate luminance signal), the dark input video (black signal) or the like is inputted, it becomes possible to improve contrast of the video to be projected. In particular, according to the present embodiment, the setting for the intermediate input video are provided and switching of them is executed in plural steps, whereby it is possible to cause a change in brightness of video and/or a tone or shade of colors due to switching of the light source controls to become mild.

Third Embodiment

A basic configuration, a control method and the like of a projection video display apparatus 100 according to a third embodiment are similar to those of the projection video display apparatus 100 according to the first embodiment described above. However, a control for light sources 150 is different from each other. Hereinafter, this difference will be described mainly with reference to FIG. 5.

Figure 5:
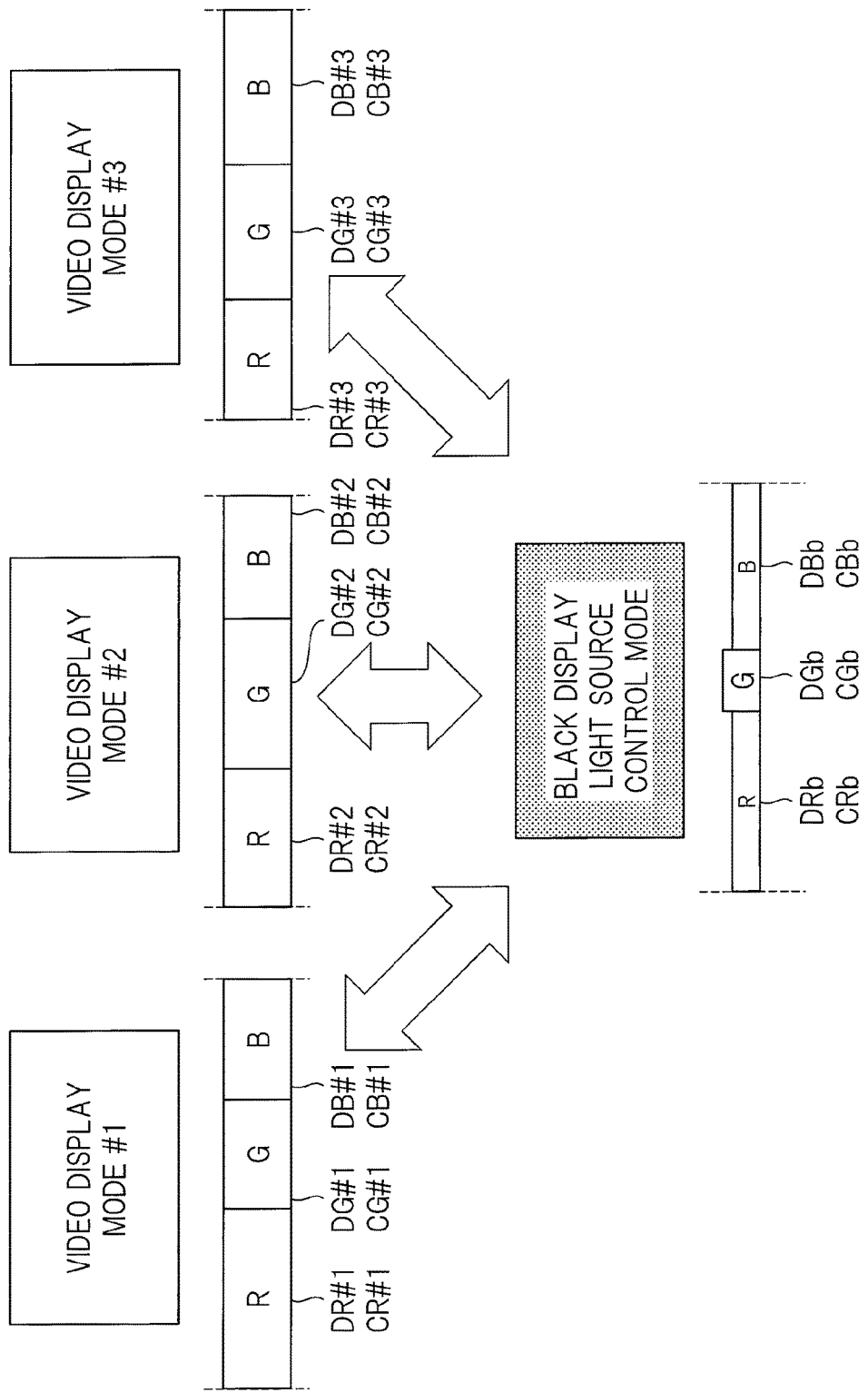
FIG. 5 is a view illustrating an outline of a control example of light sources according to a third embodiment of the present invention.

FIG. 5 is a view illustrating an outline of a control example of the light sources 150 according to the present third embodiment. The control for the light sources 150 according to the present embodiment is an example in which the control is applied to a case where a plurality of video display modes with different settings for white balance is provided and a common black display light source control mode is used for the plurality of video display modes. By communalizing the black display light source control mode for the plurality of video display modes, it is possible to simplify the control while obtaining high contrast in each of the video display modes.

Namely, the projection video display apparatus 100 according to the present embodiment can switch the plurality of video display modes whose setting for white balance is different from each other. Note that it is desirable that, when to switch the plurality of video display modes whose setting for white balance is different from each other, the controller 110 not only differentiates controls for the plurality of light sources 150, but also controls an amount of reflection (or an amount of transmission) of each light on the display element 102 to adjust white balance thereof. This causes resolution of the amount of adjustment for white balance to become better. In the plurality of video display modes whose setting for white balance is different from each other, in a case where an input signal is the brightest white signal, a plurality of white display light source control modes whose combination between a lighting ratio and a current value per unit is different from each other is used in the control for the plurality of light sources. Further, in a case where the input signal is the darkest black signal, the black display light source control mode whose setting for the combination between the lighting ratio and the current value per unit is common is used in the control for the plurality of light sources in any of the plurality of video display modes whose setting for white balance is different from each other.

In the example of FIG. 5, as the plurality of video display modes whose setting for white balance is different from each other, there are a video display mode #1 in a case of a white signal with a rich red component, a video display mode #3 in a case of a white signal with a rich blue component, and a video display mode #2 in a case of a white signal between the video display modes #1 and #2. In order to change expression of white, a plurality of video display modes whose lighting ratio per unit time is different from each other is provided. For example, in the video display mode #1, the lighting ratios per unit time have a relationship of DR#1>DB#1>DG#1. In the video display mode #2, the lighting ratios per unit time have a relationship of DG#2>DR#2>DB#2. In the video display mode #3, the lighting ratios per unit time have a relationship of DB#3>DG#3>DR#3. In the video display modes #1 to #3, the current values have a relationship of CR#1 to #3=CG#1 to #3=CB#1 to #3.

In any of the video display modes #1 to #3, the same black display light source control mode is used at the time of detection of input video of a black signal. This black display light source control mode is a black display light source control mode in which the setting for the combination between the lighting ratio and the current value per unit is common in the control for the plurality of light sources 150 in a case where the input signal is the darkest black signal. In the common black display light source control mode, for example, the lighting ratios per unit time have a relationship of DRb>DBb>DGb, and the current values have a relationship of CGb>CRb=CBb.

In a case where the input signal is the brightest white signal, the plurality of white display light source control modes whose setting for the combination between the lighting ratio and the current value per unit is different from each other is used in the control for the plurality of light sources 150 in each of the video display modes #1 to #3.

As explained above, according to the projection video display apparatus 100 of the present embodiment, in a case where the video display mode can be switched among the plurality of video display modes #1 to #3 and the input signal is the white signal, the different white display light source control mode is used in each of the video display modes #1 to #3. However, in a case where the input signal is the black signal, the common black display light source control mode is used even in each of the video display modes #1 to #3. This makes it possible to make contrast of projected video higher in a case where the plurality of video display modes #1 to #3 is applied thereto. Further, since there is no need to prepare a plurality of black display light source control modes, it is possible to simplify the control.

Fourth Embodiment

A basic configuration, a control method and the like of a projection video display apparatus 100 according to a fourth embodiment are similar to those of the projection video display apparatus 100 according to the first embodiment described above. However, a control for light sources 150 is different from each other. Hereinafter, this difference will be described mainly with reference to FIG. 6.

Figure 6:
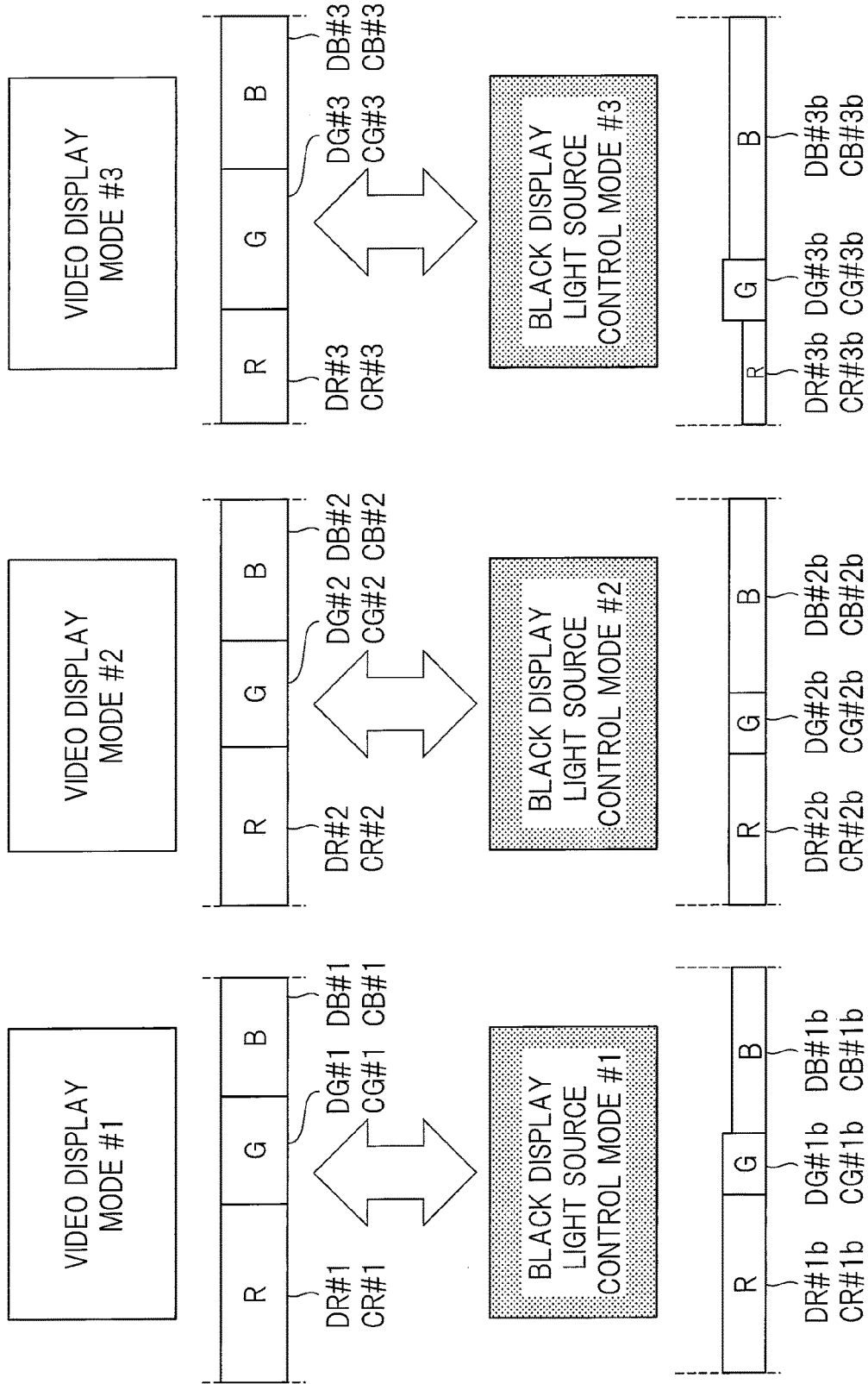
FIG. 6 is a view illustrating an outline of a control example of light sources according to a fourth embodiment of the present invention.

FIG. 6 is a view illustrating an outline of a control example of the light sources 150 according to the present fourth embodiment. The control for the light sources 150 according to the present embodiment is an example in which a different black display light source control mode is used for each of a plurality of video display modes in a case of the third embodiment described above (FIG. 5).

Namely, in the plurality of video display modes whose setting for white balance is different from each other, in a case where an input signal is the brightest white signal, the projection video display apparatus 100 according to the present embodiment uses a plurality of white display light source control modes whose combination between a lighting ratio and a current value per unit is different in a control for a plurality of light sources. Further, in each of the plurality of video display modes whose setting for white balance is different from each other, in a case where the input signal is the darkest black signal, the projection video display apparatus 100 uses a plurality of black display light source control modes whose combination between the lighting ratio and the current value per unit is different from each other in the control for the plurality of light sources. In a case where the input signal is the darkest black signal, the display element 102 executes video display of the black signal so that brightness of the video becomes the smallest. Thus, under such a situation, emitting states of the light sources determines a tone or shade of colors of the video display of the black signal. Since colors are to be perceived by eyes of a human even on the video display of the black signal, by preparing the black display light source control modes for the different video display modes, it becomes possible to cause a user to perceive the tone or shade of colors of the video display of the black signal suitable for each of the video display modes.

In the example of FIG. 6, as well as the third embodiment described above, there are video display modes #1 to #3 as the plurality of video display modes whose setting for white balance is different from each other. The projection video display apparatus 100 has a plurality of black display light source control modes #1 to #3 for every video display mode. For example, in the black display light source control mode #1, the lighting ratio per unit time has a relationship of DR#1b>DB#1b>DG#1b, and the current value has a relationship of CR#1b=CG#1b>CB#1b. In the black display light source control mode #2, the lighting ratio per unit time has a relationship of DB#2b>DR#2b>DG#2b and the current value has a relationship of CG#2b=CG#2b=CB#2b. In the black display light source control mode #3, the lighting ratio per unit time has a relationship of DB#3b>DR#3b>DG#3b, and the current value has a relationship of CG#3b>CB#3b>CR#3b. Note that only the current values may be different from each other in the black display light source control modes #1 to #3.

As explained above, according to the projection video display apparatus 100 of the present embodiment, in a case where the projection video display apparatus 100 can switch the plurality of video display modes #1 to #3 and the input signal is the white signal, the different white display light source control mode is used in each of the video display modes #1 to #3. In a case where the input signal is the black signal, the different white display light source control mode is also used in each of the video display modes #1 to #3. This makes it possible to cause the user to perceive the tone or shade of colors of the video display of the black signal suitable for each of the video display modes in a case where the plurality of video display modes #1 to #3 is applied thereto.

Fifth Embodiment

A basic configuration, a control method, and the like of a projection video display apparatus 100 according to a fifth embodiment are similar to those of the projection video display apparatus 100 according to the first embodiment described above. However, a control for light sources 150 is different from each other. Hereinafter, this difference will be described mainly with reference to FIG. 7 to FIG. 9.

Figure 7:
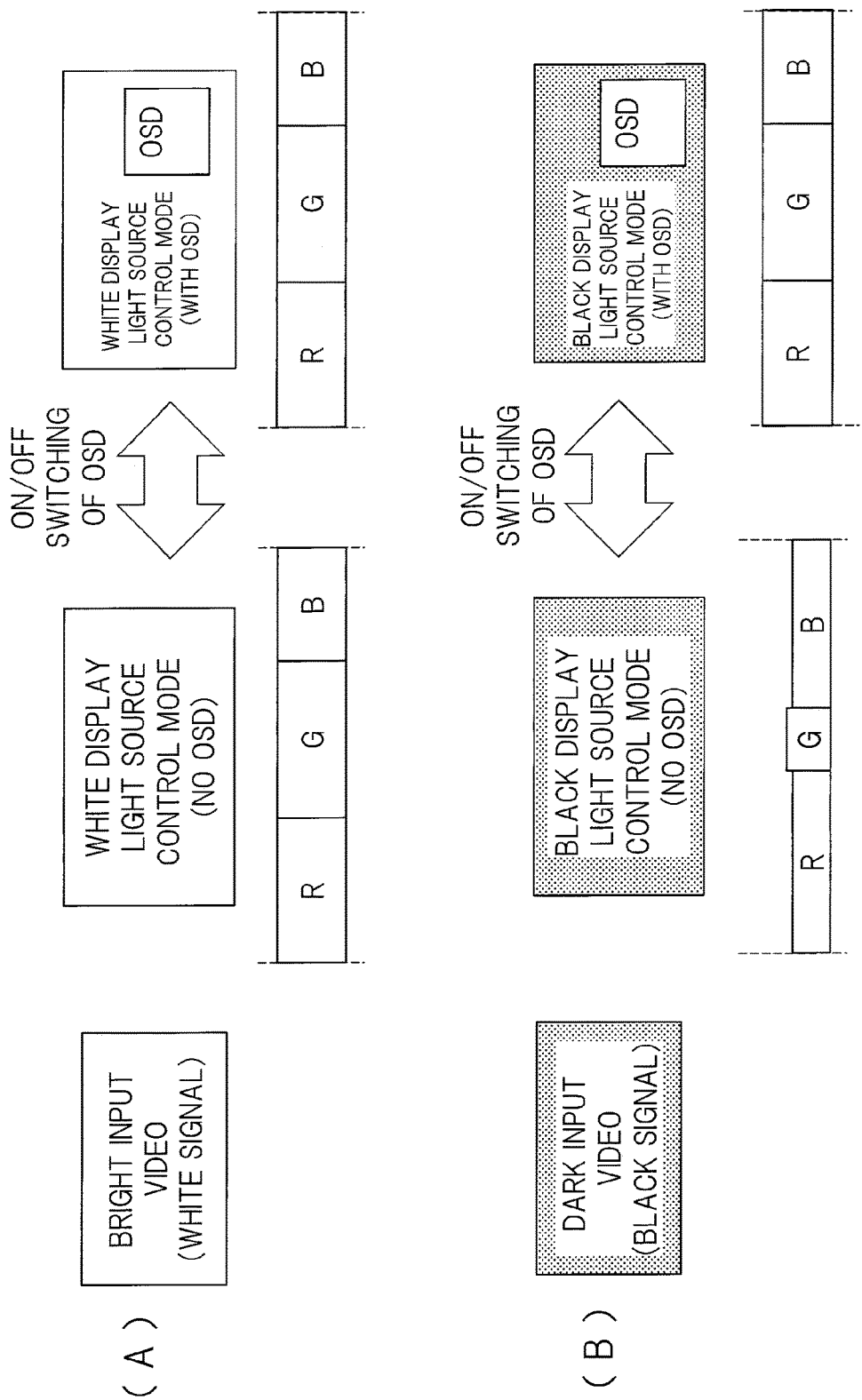
FIG. 7 is a view illustrating an outline of a control example of light sources according to a fifth embodiment of the present invention.

FIG. 7 is a view illustrating an outline of a control example of the light sources 150 according to the present fifth embodiment. The control for the light sources 150 according to the present embodiment is an example in which switching of light source control modes when an OSD (On Screen Display) is superimposed onto input video is added to each of the cases of the first to fourth embodiments (FIG. 3 to FIG. 6) described above and the light source control modes are switched in accordance with presence or absence of superposition of the OSD even in a case where an input video signal with the same brightness is inputted. Note that the OSD is a function to superimpose any or some of various kinds of setting screens and various kinds of notification display screens to a user of the projection video display apparatus onto a screen and display it. Note that the user is allowed to carry out an operational input to the superimposed various kinds of setting screens by using the operational signal input unit 107. Further, the user can grasp a state of the projection video display apparatus by the superimposed various kinds of notification display screens.

FIG. 7 illustrates one example of a case where the light source control modes are switched in accordance with presence or absence of superposition of the OSD. FIG. 7(A) is a control example of a case where bright video is an input signal. A light source control mode for white display when there is no superposition of an OSD and a light source control mode for white display when there is superposition of an OSD are prepared. However, in the light source control mode for white display, the control for the light sources 150 has already been executed in no OSD superposition state so that an amount of luminescence becomes larger. Thus, there is no need to set from a state where there is OSD superposition to a brighter light source control state. Therefore, in a case where the bright video is the input signal, the same light source control may be executed between the light source control mode for white display in which there is no OSD superposition and the light source control mode for white display in which there is OSD superposition. On the other hand, FIG. 7(B) is a control example of a case where dark video is an input signal. A light source control mode for black display when there is no superposition of an OSD and a light source control mode for black display when there is superposition of an OSD are prepared. Here, as have already been explained in the first to fourth embodiments (FIG. 3 to FIG. 6), in a case where dark video is an input signal, the light sources 150 become a light source control state in which an amount of luminescence becomes smaller. Thus, when an OSD is superimposed in this light source control state, light quantity of the light sources 150 is small. Therefore, visibility of the OSD for the user becomes very worth. Accordingly, in the example of FIG. 7(B), in the light source control mode for black display when there is no OSD superposition, as have already been explained in the first to fourth embodiments (FIG. 3 to FIG. 6), the light sources 150 are controlled so that the amount of luminescence becomes smaller. In the light source control mode for black display when there is OSD superposition, a control is changed so that the amount of luminescence becomes larger than that in the light source control mode for black display when there is no OSD superposition. This makes it possible to heighten visibility of the OSD for the user. This thought is limited to the case where the dark video is the input signal, and can be applied to a case where video with intermediate luminance is an input signal. Namely, the projection video display apparatus 100 according to the present embodiment executes an operation to differentiate a light source control mode when an OSD is superimposed onto an input video signal and the video is displayed from a light source control mode when an OSD is not superimposed onto an input video signal and the video is displayed in a case where the input signal has predetermined brightness.

Presence or absence of the OSD superposition is not detected on the basis of the input video, but may be detected on the basis of a histogram, an APL, a peak level or the like of video at a step of an OSD superimposing process, for example, unlike detection of brightness of the input video. Namely, the histogram, the APL, and the peak level of the video onto which an OSD is superimposed can be detected because they are changed from the histogram, the APL, and the peak level of the input video. Alternatively, it may be detected on the basis of an internal state of software. In a case where the presence or absence of the OSD superposition is detected on the basis of the internal state of software, it is detected that the OSD exists on a screen when there is an operation to switch the OSD into ON. It is detected that no OSD exists on the screen when there is an operation to switch the OSD into OFF. This state may be managed by a flag indicating ON or OFF of the OSD or the like in the internal processing of software.

As the light source control for the light sources 150 according to the present fifth embodiment, various control examples can be considered in addition to the example of FIG. 7. Hereinafter, these control examples will be described.

FIG. 8 and FIG. 9 are views illustrating various control examples of the light source control states of the light sources 150 according to the present fifth embodiment. FIG. 8 illustrates an <example in which the same operation as that according to the first embodiment is executed in a case where the OSD is turned OFF>, and FIG. 9 illustrates an <example in which the same operation as that according to the second embodiment is executed in a case where the OSD is turned OFF>. Note that each of first, third, fourth, fifth, sixth, seventh, ninth, and tenth light source control states, which will be used for explanation of FIG. 8 and FIG. 9, will be described so as to be light source control states in which an amount of luminescence of the light source becomes larger as the number becomes larger.

<Example in which the Same Operation as that According to the First Embodiment is Executed in a Case where OSD is Turned OFF>

As illustrated in FIG. 8, as an example in which the same operation as that according to the first embodiment described above (FIG. 3) is executed in a case where the OSD is turned OFF, a control such as a first control example or a second control example may be executed, for example.

In the first control example, in a case where the OSD is turned OFF and an input signal is a white signal, the light sources 150 are operated in the tenth light source control state in which the amount of luminescence is large. In a case where the input signal is a black signal, the light sources 150 are operated in the first light source control state in which the amount of luminescence is small. Namely, it may be thought that the similar operation to that according to the first embodiment described above is executed when the OSD is turned OFF in the first control example. Further, in the first control example, the light sources 150 are operated in the tenth light source control state when the OSD is turned ON and the input signal is any of the white signal and the black signal. Namely, when the OSD is turned ON, the light sources 150 are operated in the same tenth light source control state as the white display when the OSD is turned OFF regardless of brightness of the input signal. This causes an effect that user visibility regarding the display content of the OSD is maximized by setting the light source control state to a bright light source control state the same as that when the input signal is the white signal in a case where the OSD is displayed.

In the second control example, in a case where the OSD is turned OFF and an input signal is a white signal, the light sources 150 are operated in the tenth light source control state as well as the first control example. In a case where the input signal is a black signal, the light sources 150 are operated in the first light source control state. Further, in the second control example, in a case where the OSD is turned ON and the input signal is the white signal, the light sources 150 are operated in the tenth light source control state. In a case where the input signal is the black signal, the light sources 150 are operated in a fifth light source control state. For example, there is not the fifth light source control state when the OSD is turned OFF, and this fifth light source control state is a light source control state dedicated when the OSD is turned ON. The amount of luminescence of the light source is larger than that in the first light source control state, and the amount of luminescence of the light source is smaller than that in the tenth light source control state. By controlling the amount of luminescence in this manner, the amount of luminescence of the light source can be made larger in a case where the input signal is the black signal but the OSD is turned ON compared with a case where the input signal is the black signal and the OSD is turned OFF. This makes it possible to heighten visibility of the user regarding the display content of the OSD. Moreover, at this time, by not heightening the amount of luminescence of the light source when the input signal is the black signal but the OSD is turned ON to the maximum amount of luminescence, there is an effect that it is possible to cause a change in the amount of luminescence of the light source when the OSD is switched between ON and OFF to become mild.

<Example in which the Same Operation as that According to the Second Embodiment is Executed in a Case where OSD is Turned OFF>

As illustrated in FIG. 9, as an example in which the same operation as that according to the second embodiment described above (FIG. 4) is executed in a case where the OSD is turned OFF, a control such as a third control example, a fourth control example, a fifth control example or a sixth control example may be executed, for example.

In the third control example, in a case where the OSD is turned OFF and the input signal is the white signal, the light sources 150 are operated in the tenth light source control state in which the amount of luminescence is large. In a case where the input signal is a first intermediate luminance signal, the light sources 150 are operated in the seventh light source control state whose amount of luminescence is smaller than that in the tenth light source control state. In a case where the input signal is a second intermediate luminance signal, the light sources 150 are operated in the third light source control state whose amount of luminescence is smaller than that in the seventh light source control state. In a case where the input signal is the black signal, the light sources 150 are operated in the first light source control state whose amount of luminescence is smaller than that in the third light source control state. Namely, it may be thought that the similar operation to that according to the second embodiment described above is executed when the OSD is turned OFF in the third control example. Further, in the third control example, under a situation that the OSD is turned ON, any of in a case where and the input signal is the white signal, in a case where the input signal is the first intermediate luminance signal, in a case where the input signal is the second intermediate luminance signal, and in a case where the input signal is the black signal, the light sources 150 are operated in the tenth light source control state. This causes an effect that user visibility regarding the display content of the OSD is maximized by setting the light source control state to a bright light source control state the same as that when the input signal is the white signal in a case where the OSD is turned ON.

In the fourth control example, when the OSD is turned OFF, the same control when the OSD is turned OFF in the third control example is executed. Further, in the fourth control example, in a case where the OSD is turned ON and the input signal is the white signal, the light sources 150 are operated in the tenth light source control state. In a case where the input signal is the first intermediate luminance signal, the second intermediate luminance signal, or the black signal, the light sources 150 are operated in the seventh light source control state.

Namely, in the fourth control example, the light source control state when the OSD is turned ON and the light source control state when the OSD is turned OFF are set to the same light source control state until the input signal becomes a specific brightness level (in the present embodiment, the first intermediate luminance signal) or higher. Moreover, in a case of the second intermediate luminance signal in which the input signal is a signal whose brightness level is less than the specific brightness level (in the present embodiment, the first intermediate luminance signal) or in a case where the input signal is the black signal, in the light source control state when the OSD is turned ON, the light source control state is set to a light source control state with predetermined brightness (in the present embodiment, fixed to the seventh light source control state) in which the amount of luminescence of the light source becomes larger than the light source control state when the OSD is turned OFF.

In other words, in the fourth control example, in a state that the OSD is turned OFF, the input signal is changed in turn among the white signal, the first intermediate luminance signal, the second intermediate luminance signal, and the black signal. In addition, in a case where brightness of the input signal is reduced, the light source control state is controlled so as to change from the tenth light source control state in which the amount of luminescence of the light source is largest to the first light source control state in which the amount of luminescence of the light source is smallest via the seventh light source control state and the third light source control state. On the other hand, in a state that the OSD is turned ON, in a case where the input signal is changed in this order from the white signal, the first intermediate luminance signal, the second intermediate luminance signal, and the black signal and brightness of the input signal is thereby reduced, the light source control state is changed from the tenth light source control state in which the amount of luminescence of the light source is largest to the seventh light source control state in which the amount of luminescence of the light source is smaller than that in the tenth light source control state when the input signal is changed from the white signal to the first intermediate luminance signal. However, in this case, even though the input signal is changed in this order of the second intermediate luminance signal and the black signal, the light source control state is fixed to the seventh light source control state. Herewith, the light source control state is not changed into a light source control state in which the amount of luminescence of the light source is small. By controlling the amount of luminescence in this manner, there is an effect that it is possible to secure visibility of the user regarding the display content of the OSD to a predetermined level in a case where an input signal with predetermined brightness or lower is inputted.

In the fifth control example, when the OSD is turned OFF, the light source control state is set to the same when the OSD is turned OFF in the third control example. Further, in the fifth control example, in a case where the OSD is turned ON and the input signal is the white signal, the light sources 150 are operated in the tenth light source control state. In a case where the input signal is the first intermediate luminance signal, the light sources 150 are operated in the ninth light source control state. In a case where the input signal is the second intermediate luminance signal, the light sources 150 are operated in the sixth light source control state. In a case where the input signal is the black signal, the light sources 150 are operated in the fourth light source control state. Here, the ninth light source control state, the sixth light source control state and the fourth light source control state are light source control states dedicated when the OSD is turned ON, and there are not the ninth, sixth and fourth light source control states when the OSD is turned OFF.

Namely, in the fifth control example, in a case where the intermediate luminance signal or the black signal is the input signal and the OSD is turned ON, a light source control state in which the amount of luminescence is larger than that in the light source control state when the OSD is turned OFF is used. This makes it possible to heighten visibility of the user regarding the display content of the OSD in the fifth control example when the OSD is turned ON with respect to a signal other than the white signal that is the light source control state in which visibility of the user regarding the display content of the OSD is sufficiently high, that is, the intermediate luminance signal or the black signal compared with a case where the OSD is turned OFF.

In the sixth control example, when the OSD is turned OFF, the light source control state is set to the same when the OSD is turned OFF in the third control example. Further, in the sixth control example, in a case where the OSD is turned ON and the input signal is the white signal, the light sources 150 are operated in the tenth light source control state. In a case where the input signal is the first intermediate luminance signal, the light sources 150 are operated in the tenth light source control state. In a case where the input signal is the second intermediate luminance signal, the light sources 150 are operated in the seventh light source control state. In a case where the input signal is the black signal, the light sources 150 are operated in the third light source control state. Namely, when the OSD is turned ON, the light source control state is switched to a light source control state in a case of an input signal with brightness one-step brighter than that when the OSD is turned OFF.

Namely, in the sixth control example, as well as the fifth control example, in a case where the intermediate luminance signal or the black signal is the input signal and the OSD is turned ON, a light source control state in which the amount of luminescence is larger than that in the light source control state when the OSD is turned OFF is used. This makes it possible to heighten visibility of the user regarding the display content of the OSD in the sixth control example when the OSD is turned ON with respect to a signal other than the white signal that is the light source control state in which visibility of the user regarding the display content of the OSD is sufficiently high, that is, the intermediate luminance signal or the black signal compared with a case where the OSD is turned OFF. Moreover, the light source control state in a case of the input signal with brightness one-step brighter than that when the OSD is turned OFF is applied to the light source control state when the OSD is turned ON. Therefore, it is possible to make the total number of light source control states used in the sixth control example smaller than that in the fifth control example, and this makes it possible to simplify the control compared with the fifth control example.

Although it is not illustrated in the drawings, in an <example in which the same operation as that according to the third embodiment is executed in a case where OSD is turned OFF>, on the basis of the first to sixth control examples described above, the light source control states for the white signal and the intermediate luminance signal, whose chromaticity is different from each other, may be prepared for every video display mode.

Although it is not illustrated in the drawings, in an <example in which the same operation as that according to the fourth embodiment is executed in a case where OSD is turned OFF>, on the basis of the first to sixth control examples described above, the light source control states for the white signal, the intermediate luminance signal and the black signal, whose chromaticity is different from each other, may be prepared for every video display mode.

As explained above, according to the projection video display apparatus 100 of the present embodiment, by adding switching of the light source control modes when the OSD is superimposed, it is possible to switch the light source control modes in accordance with presence or absence of superposition of the OSD even in a case where the input signal with the same brightness is inputted.

Sixth Embodiment

A basic configuration, a control method, and the like of a projection video display apparatus 100 according to a sixth embodiment are similar to those of the projection video display apparatus 100 according to the first embodiment described above. However, a control for light sources 150 is different from each other. Hereinafter, this difference will be described mainly with reference to FIG. 10 to FIG. 15.

In the projection video display apparatus 100 according to the present embodiment, a lighting period of each of a plurality of light sources in monochrome is provided, and a lighting period of a plurality of colors at the same time is provided. A light source control mode to execute a control to change a lighting ratio and a current value per unit of each of the light sources is provided. Namely, in this light source control mode, there is a period of lighting each of the plurality of light sources containing red, green, and blue in monochrome. A lighting period of the light sources for two colors or three colors at the same time among these light sources is further provided. A control to change each of the lighting ratio and the current value per unit of each of the light sources is executed.

Further, in the projection video display apparatus 100 according to the present embodiment, a light source control mode to execute a control to cause the plurality of light sources to light the respective colors in a time-division manner and change each of the lighting ratio and the current value per unit of each of the light sources is provided. Namely, in this light source control mode, a control to cause the plurality of light sources containing red, green, and blue to light the respective colors in a time-division manner and change each of the lighting ratio and the current value per unit of each of the light sources is executed.

The control for the light sources 150 according to the present embodiment is an example in which mixed color generated by mixing these colors is added to a lighting ratio per a unit of time ($\Delta t$) in addition to red (R), green (G) and blue (B) in each of the first to fifth embodiments described above. As an example of the mixed color, there are white (W) obtained by mixing three colors of red (R), green (G) and blue (B), cyan (C) obtained by mixing two colors of green (G) and blue (B), yellow (Y) obtained by mixing two colors of red (R) and green (G), magenta (M) obtained by mixing two colors of blue (B) and red (R), and the like.

Figure 10:
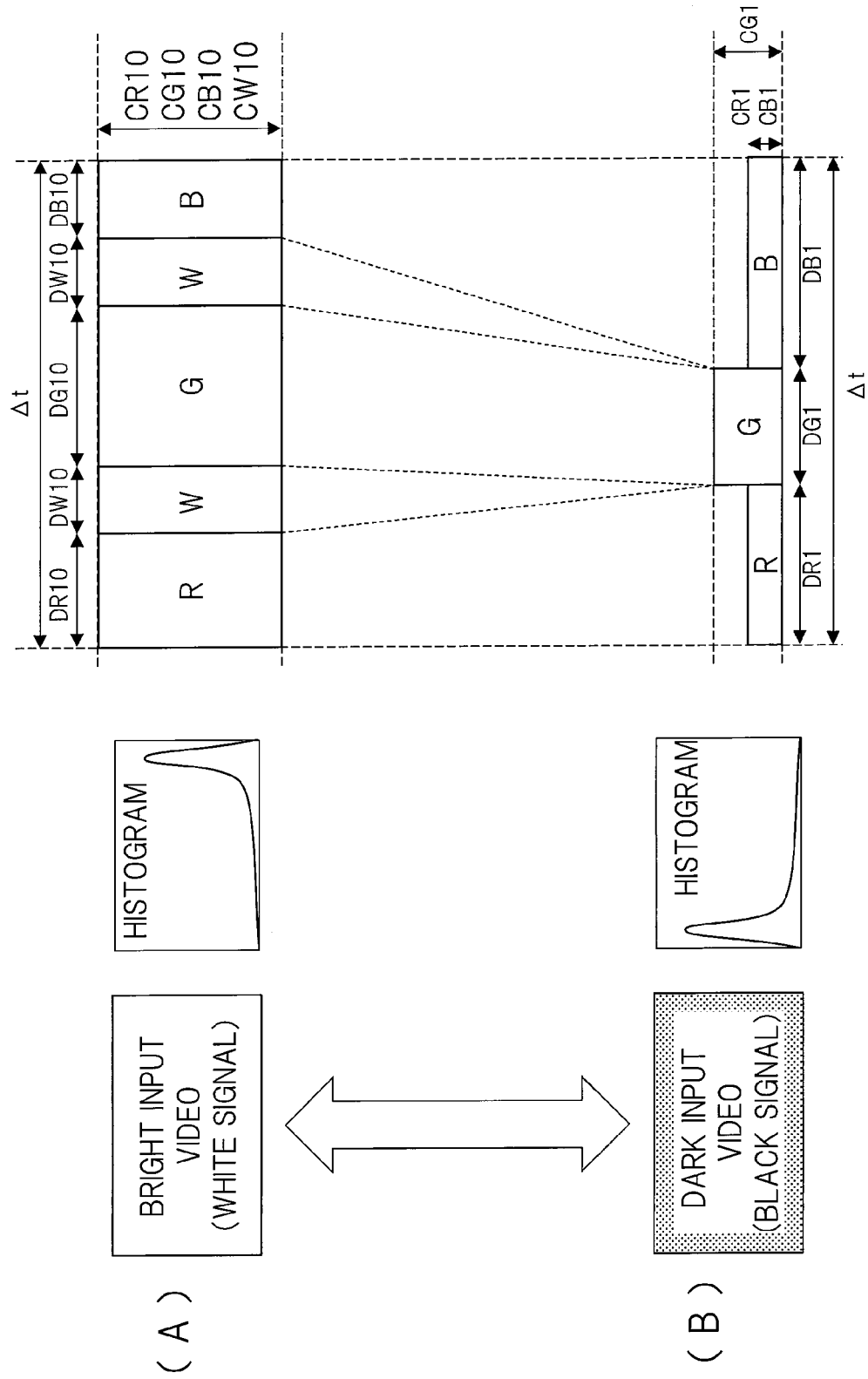
FIG. 10 is a view illustrating an outline of a control example of light sources according to a sixth embodiment of the present invention.
Figure 12:
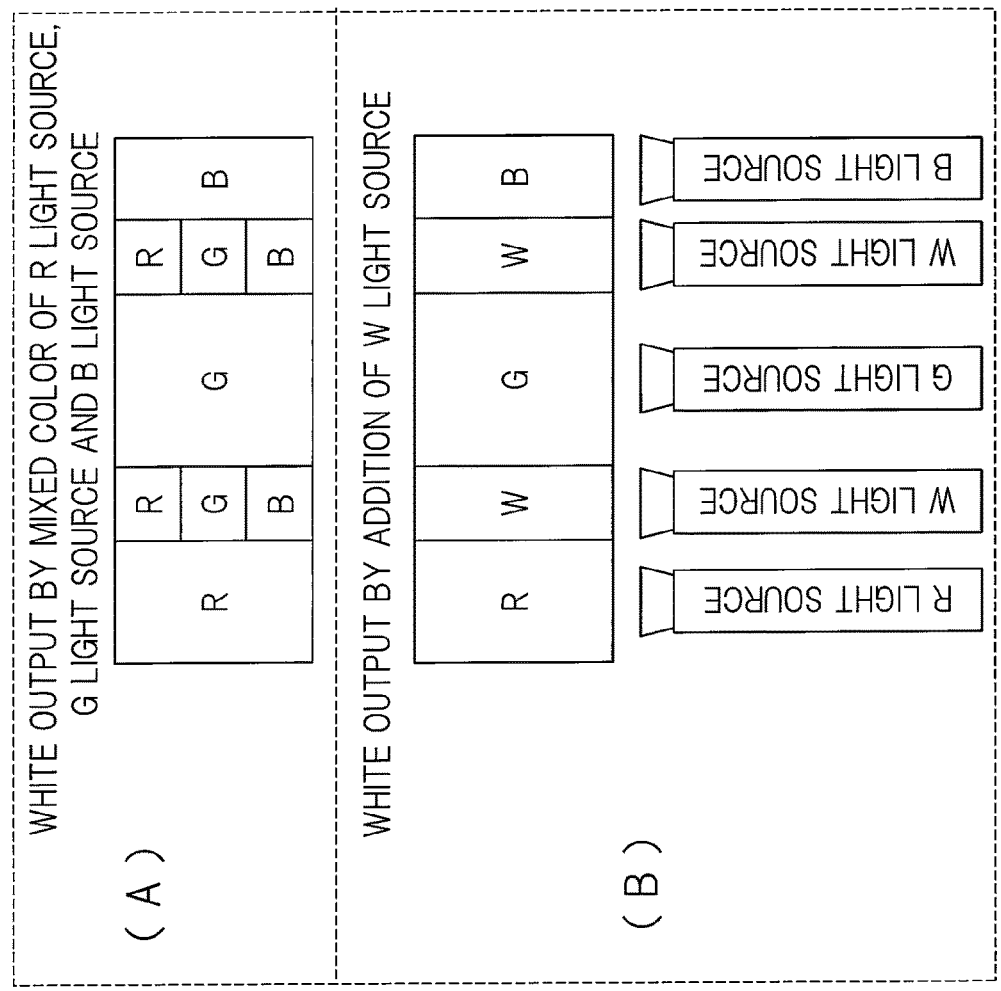
FIG. 12 is a view illustrating an outline of the control example of the light sources according to the sixth embodiment of the present invention.

FIG. 10, FIG. 11 and FIG. 12 are views each illustrating an outline of a control example of the light sources 150 according to the present sixth embodiment. A control for the light sources 150 illustrated in FIG. 10 is an example in which an emitting period for white (W) of the mixed color is added into the example according to the first embodiment described above (FIG. 3). This white to be added may be generated by causing an R light source, a G light source and a B light source to light at the same time, for example. Alternatively, a light source for white may be added separately and emit light. This white has a lighting ratio DW and a current value CW per the unit of time ($\Delta t$). By adding the emitting period for white (W) of the mixed color, it is possible to raise the maximum value of brightness of video per unit time compared with a control in which there is no emitting period for white (W) of the mixed color.

As illustrated in FIG. 10(A), for example, in a case where bright input video (white signal) is inputted, white (W) is inserted between red (R) and green (G) and between green (G) and blue (B), whereby the lighting ratio and the current value per the unit of time (Δt) is set to a desired relationship. For example, the lighting ratio per the unit of time (Δt) is set to a relationship of DG10>DW10>DR10>DB10. The current values in this case are set to a relationship of CR10=CG10=CB10=CW10.

Next, as illustrated in FIG. 10(B), in a case where dark input video (black signal) is inputted, white (W) is not inserted. In a case where white (W) is not inserted, by causing the R light source, the G light source and the B light source to light in a time-division manner so as not to be overlapped, it becomes the same as the case illustrated in FIG. 3. As described above, merit to add the emitting period for white (W) of the mixed color is that the maximum value of brightness per unit time is raised. In the dark input video (black signal) in which reduction of the amount of luminescence of the light source is required, there is no merit to add the emitting period for the white (W) of the mixed color.

Further, in the example in which the mixed color is to be added, a control may be executed as follows. For example, in FIG. 11, in a case where the bright input video (white signal) is inputted, the light sources 150 are controlled as well as FIG. 10(A) (FIG. 11 (A)). On the other hand, in a case where the dark input video (black signal) is inputted, as illustrated in FIG. 11(B), setting of a combination of a lighting ratio and a current value per unit time may be set to a desired relationship so as to add an emitting period for mixed color (magenta (M) in the example of FIG. 11(B)) and adjust a tone or shade of black. Namely, as illustrated in FIG. 11(A), even though there is white (W) in an original lighting pattern when the bright input video (white signal) is inputted, white (W) may be removed in a lighting pattern when the black signal is inputted. As illustrated in FIG. 11(B), white (W) may be replaced by mixed color of magenta (M) or the like that is darker. Further, in a lighting pattern when the white signal is inputted, other color (cyan (C), yellow (Y), magenta (M) or the like) may be inserted in addition to white (W) or in place of white (W).

Further, as illustrated in FIG. 12(A), as the lighting pattern when the white signal is inputted in FIG. 11 and FIG. 12, the R light source, the G light source and the B light source may be caused to light at the same time (mixed color). Alternatively, as illustrated in FIG. 12(B), a W (white) light source may simply be added. Further, a mixed color rate of white (W) generated by causing the R light source, the G light source and the B light source to light at the same time may be changed as needed. In this case, for example, it is possible to generate white with much red component or white with much blue component. Further, in addition to white, cyan may be generated by green and blue, or a light source for yellow or the like may be added.

Figure 13:
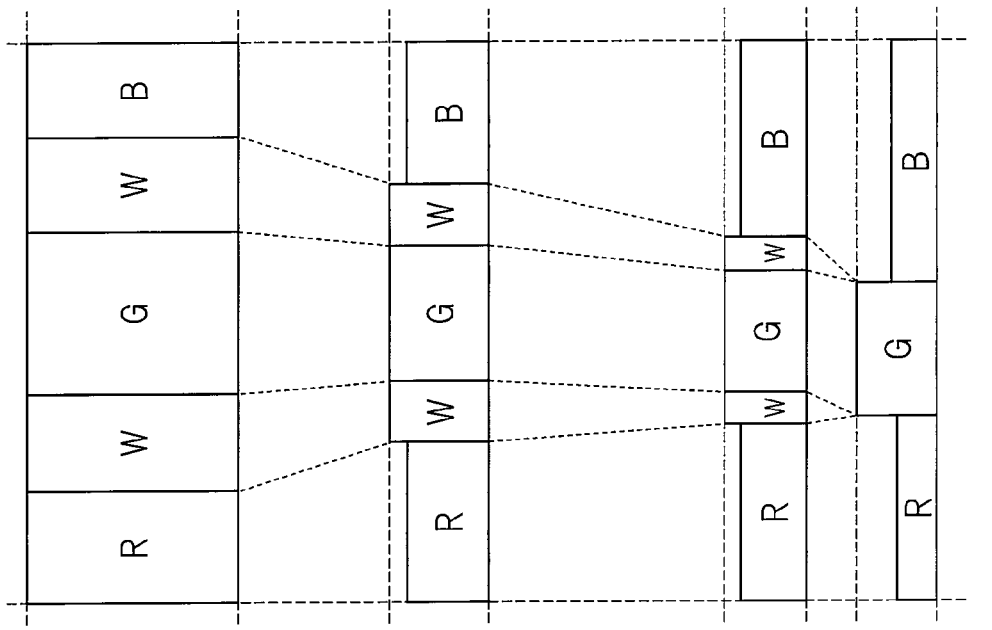
FIG. 13 is a view illustrating an outline of the control example of the light sources according to the sixth embodiment of the present invention.

FIG. 13 is a view illustrating an outline of one example of a control example of the light sources 150 according to the present sixth embodiment. A control for the light sources 150 illustrated in FIG. 13 is an example in which the emitting period for mixed color (white (W) in an example of FIG. 13) is added into the example according to the second embodiment described above (FIG. 4). As illustrated in FIG. 13, for example, each of in a case where bright input video (white signal) is inputted, in a case where intermediate input video (a first intermediate luminance signal) is inputted, and, in a case where intermediate input video (a second intermediate luminance signal) is inputted, white (W) is inserted between red (R) and green (G) and between green (G) and blue (B), and setting of the combination of the lighting ratio and the current value per unit time is set to a desired relationship. Controls other than the addition of the emitting period for the mixed color are similar to the controls that have already been explained in the second embodiment. Therefore, their explanation will be omitted. By providing the emitting period for the mixed color in this manner, it is possible to provide the projection video display apparatus in which the maximum brightness of projected video is larger (brighter) while obtaining the effects according to the second embodiment.

Figure 14:
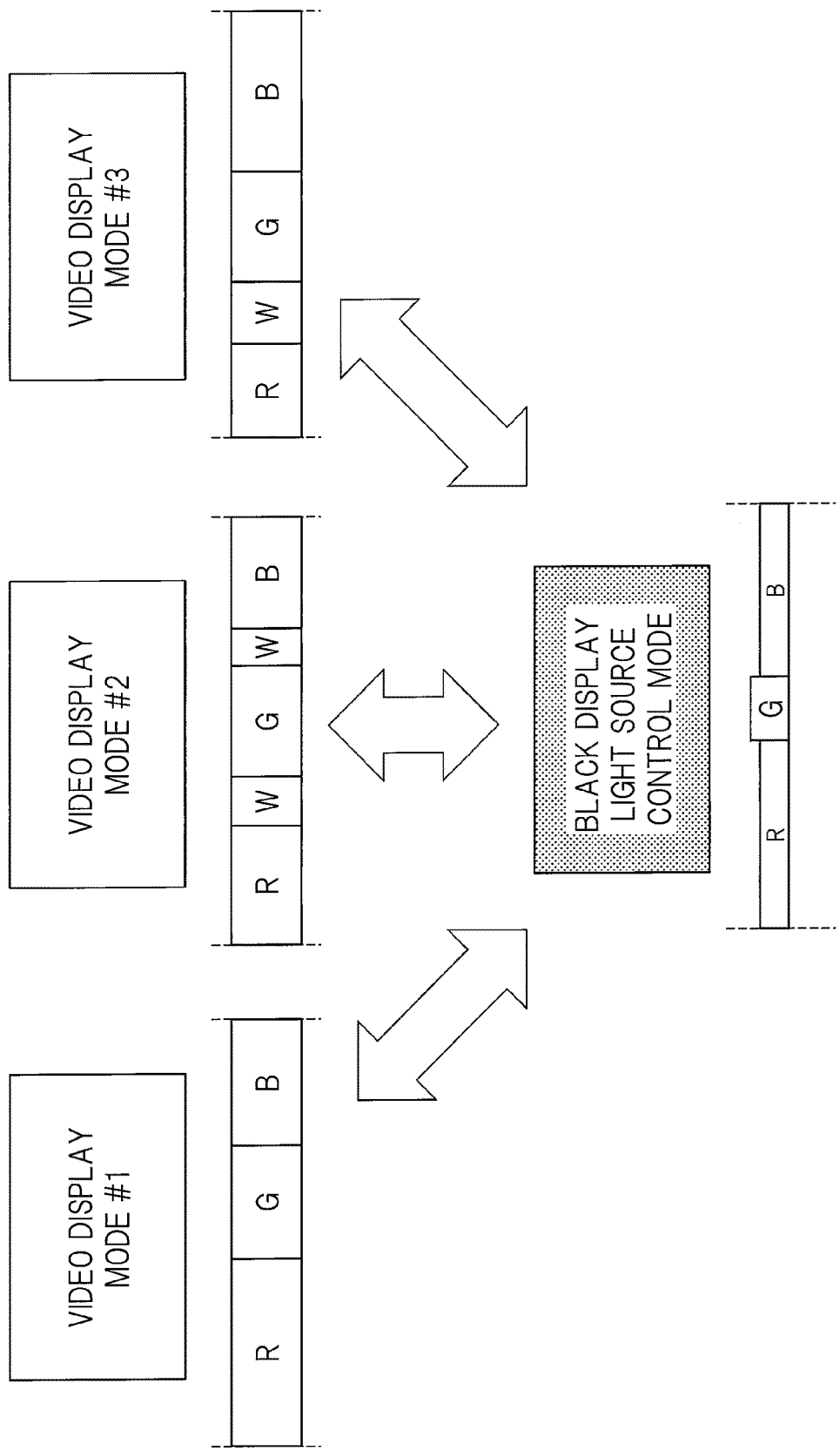
FIG. 14 is a view illustrating an outline of the control example of the light sources according to the sixth embodiment of the present invention.

FIG. 14 is a view illustrating an outline of one example of the control example of the light sources 150 according to the present sixth embodiment. A control for the light sources 150 illustrated in FIG. 14 is an example in which an emitting period for mixed color (white (W) in the example of FIG. 14) is added into the example according to the third embodiment described above (FIG. 5). As illustrated in FIG. 14, for example, in a video display mode #2, white (W) is inserted between red (R) and green (G) and between green (G) and blue (B), and setting of a combination of a lighting ratio and a current value per unit time is set to a desired relationship. In a video display mode #3, white (W) is inserted between red (R) and green (G), and setting of a combination of a lighting ratio and a current value per unit time is set to a desired relationship. Controls other than the addition of the emitting period for the mixed color are similar to the controls that have already been explained in the third embodiment. Therefore, their explanation will be omitted. By preparing the video display mode in which the emitting period for the mixed color is provided in any of the plurality of video display modes in this manner, it is possible to provide the projection video display apparatus in which the maximum brightness of projected video is larger (brighter) while obtaining the effects according to the third embodiment. Further, by preparing both the video display mode in which the emitting period for the mixed color is provided in the plurality of video display modes and the video display mode in which the emitting period for the mixed color is not provided, it is possible for a user to select a brightness-oriented video display mode and a color-reproducibility-oriented video display mode in his or her preference while obtaining the effects according to the third embodiment.

Figure 15:
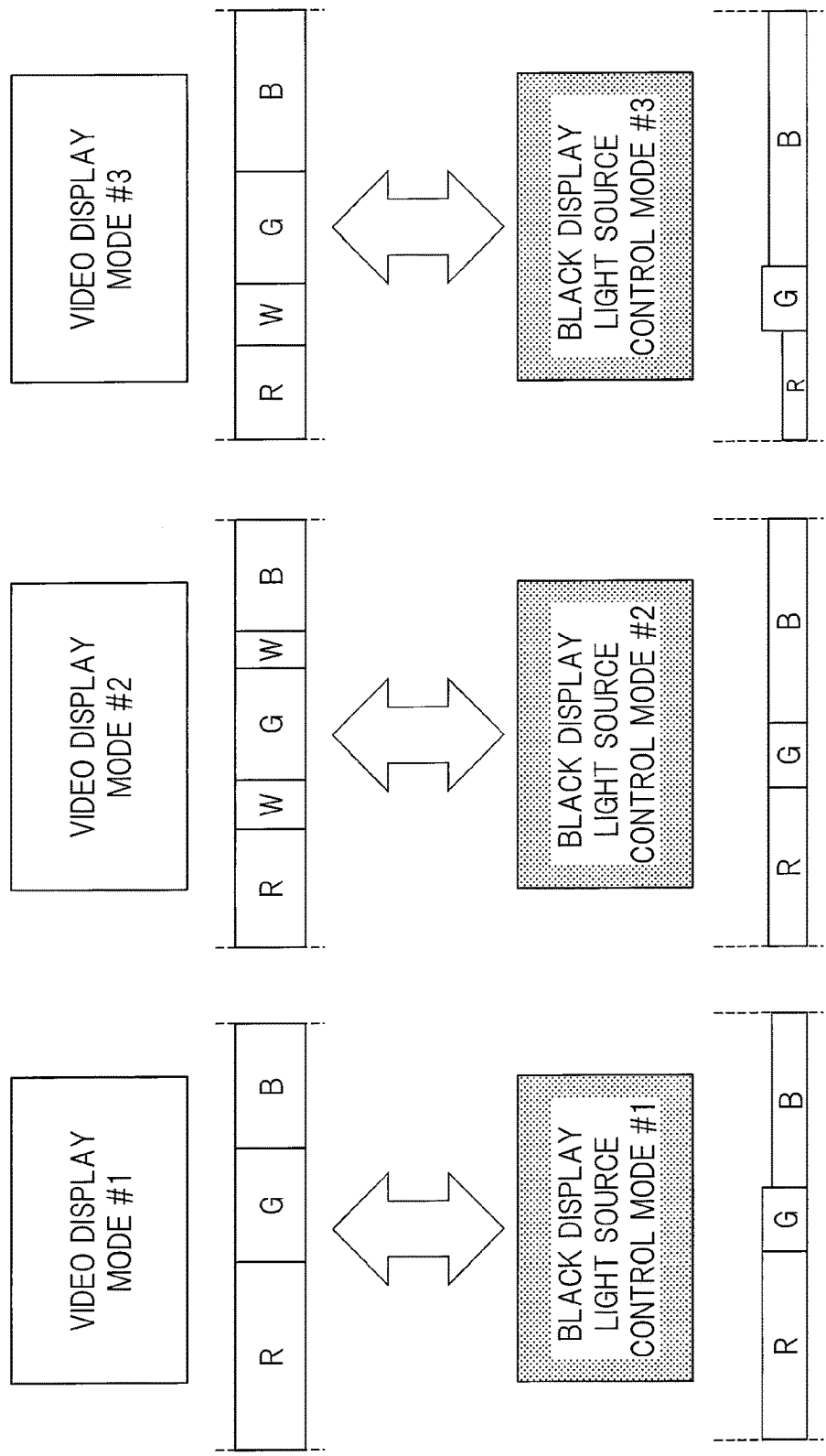
FIG. 15 is a view illustrating an outline of the control example of the light sources according to the sixth embodiment of the present invention.

FIG. 15 is a view illustrating an outline of one example of the control example of the light sources 150 according to the present sixth embodiment. A control for the light sources 150 illustrated in FIG. 15 is an example in which an emitting period for mixed color (white (W) in the example of FIG. 15) is added into the example according to the fourth embodiment described above (FIG. 6). As illustrated in FIG. 15, for example, in a video display mode #2, white (W) is inserted between red (R) and green (G) and between green (G) and blue (B), and setting of a combination of a lighting ratio and a current value per unit time is set to a desired relationship. In a video display mode #3, white (W) is inserted between red (R) and green (G), and setting of a combination of a lighting ratio and a current value per unit time is set to a desired relationship. Controls other than the addition of the emitting period for the mixed color are similar to the controls that have already been explained in the fourth embodiment. Therefore, their explanation will be omitted. By preparing the video display mode in which the emitting period for the mixed color is provided in any of the plurality of video display modes in this manner, it is possible to provide the projection video display apparatus in which the maximum brightness of projected video is larger (brighter) while obtaining the effects according to the fourth embodiment. Further, by preparing both the video display mode in which the emitting period for the mixed color is provided in the plurality of video display modes and the video display mode in which the emitting period for the mixed color is not provided, it is possible for a user to select a brightness-oriented video display mode and a color-reproducibility-oriented video display mode in his or her preference while obtaining the effects according to the fourth embodiment.

Figure 16:
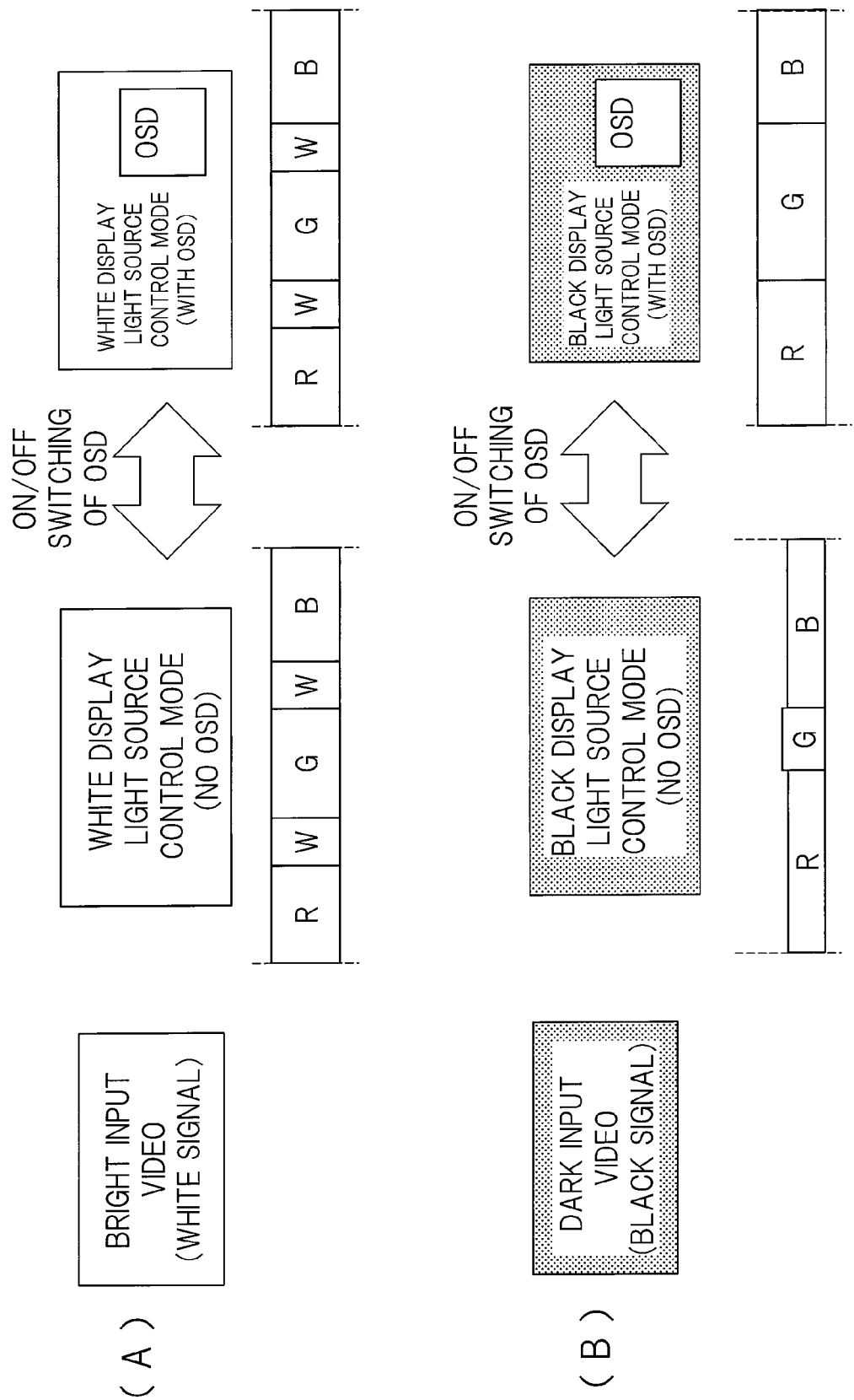
FIG. 16 is a view illustrating an outline of the control example of the light sources according to the sixth embodiment of the present invention.

FIG. 16 is a view illustrating an outline of one example of the control example of the light sources 150 according to the present sixth embodiment. A control for the light sources 150 illustrated in FIG. 16 is an example in which an emitting period for mixed color (white (W) in the example of FIG. 15) is added into the example according to the fifth embodiment described above (FIG. 7). As illustrated in FIG. 16, for example, in a normal light source control mode of a case where an OSD exists on a screen by turning the OSD ON, white (W) is inserted between red (R) and green (G) and between green (G) and blue (B), and setting of a combination of a lighting ratio and a current value per unit time is set to a desired relationship. Controls other than the addition of the emitting period for the mixed color are similar to the controls that have already been explained in the fifth embodiment. Therefore, their explanation will be omitted. By providing the emitting period for the mixed color in this manner, it is possible to provide the projection video display apparatus in which the maximum brightness of projected video is larger (brighter) while obtaining the effects according to the fifth embodiment.

As explained above, according to the projection video display apparatus 100 of the present embodiment, by adding the mixed color generated by mixing red (R), green (G) and blue (B) to the lighting ratios per the unit of time (Δt) in addition to red (R), green (G) and blue (B), it is possible to make the maximum brightness of the projected video larger (or brighter) in a case where the input video is bright video while securing darkness of the projected video in a case where the input video is dark video.

As described above, the present invention made by the present inventors has been explained specifically on the basis of the embodiments. However, the present invention is not limited to the embodiments described above, and it goes without saying that the present invention may be modified into various forms without departing from the substance thereof.

For example, the embodiments described above have been explained in detail for explaining the present invention clearly. The present invention is not necessarily limited to one that includes all configurations that have been explained. Further, a part of the configuration of one embodiment can be replaced by a configuration of the other embodiment. Further, a configuration of the other embodiment can be added to a configuration of one embodiment. Moreover, a part of the configuration of each of the embodiments can be added to the other configuration, deleted or replaced thereby.

REFERENCE SIGNS LIST

100 . . . projection video display apparatus, 101 . . . projection optical system, 102 . . . display element, 103 . . . display element driver, 106 . . . power source, 107 . . . operational signal input unit, 108 . . . nonvolatile memory, 109 . . . memory, 110 . . . controller, 115 . . . cooler, 131 . . . video input unit, 132 . . . communication unit, 133 . . . audio input unit, 140 . . . audio output unit, 150B . . . B light source, 150G . . . G light source, 150R . . . R light source, 151B . . . B light source driver, 151G G light source driver, 151R . . . R light source driver, 160 . . . illuminance sensor, 170 . . . optical unit, 171 . . . mirror, 201 to 203 . . . relay lens, 204 to 205 . . . color synthesis mirror, 206 . . . relay lens, 207 . . . rod integrator, 208 to 209 . . . relay lens, 210 . . . TIR prism, CB, CG, CR, and CW . . . current value, DB, DG, DR, and DW . . . lighting ratio per unit time.

The invention claimed is:

1. A projection video display apparatus comprising:
an input unit to which an input video signal is inputted;
a display element configured to display video on a basis of the input video signal inputted by the input unit;
a plurality of light sources;
an illumination optical system configured to guide light generated by the plurality of light sources to the display element;
a projection optical system configured to project light via the display element; and
a controller configured to control the plurality of light sources,
wherein the controller is configured to control a lighting ratio and a current value per unit time of each of the plurality of light sources to change, and
wherein as alight source control mode for each of the plurality of light sources by the controller, a black display light source control mode is provided in which a control is executed to make a relative rate of a lighting ratio per unit time for a light source with a specific color smaller than those for the other light sources and reduce a current value of each of the other light sources more greatly than a current value of the light source with the specific color in a case where the input video signal is a black signal compared with a case where the input video signal is a white signal.

2. The projection video display apparatus according to claim 1,
wherein the controller is configured to control the display element and the plurality of light sources to be switched among a plurality of video display modes in which setting for white balance is different from each other,
wherein a light source control mode for each of the plurality of light sources by the controller in the plurality of video display modes in each of which the setting for the white balance is different from each other includes a plurality of white display light source control modes in which a combination of a lighting ratio and a current value per unit time is different from each other in the control for the plurality of light sources in a case where the input video signal is the brightest white signal, and
wherein the light source control mode includes a black display light source control mode in which setting for the lighting ratio or the current value per unit time is common in the control for the plurality of light sources in any of the plurality of video display modes in which the setting for the white balance is different from each other in a case where the input video signal is the darkest black signal.

3. The projection video display apparatus according to claim 1,
wherein the controller is configured to control the display element and the plurality of light sources to be switched among a plurality of video display modes in which setting for white balance is different from each other,
wherein a light source control mode for each of the plurality of light sources by the controller in the plurality of video display modes in each of which the setting for the white balance is different from each other includes a plurality of white display light source control modes in which a combination of a lighting ratio and a current value per unit time is different from each other in the control for the plurality of light sources in a case where the input video signal is the brightest white signal, and wherein the light source control mode includes a plurality of black display light source control modes in which setting for the lighting ratio or the current value per unit time is common in the control for the plurality of light sources in each of the plurality of video display modes in each of which the combination of the lighting ratio and the current value per unit time is different from each other in a case where the input video signal is the darkest black signal.

4. The projection video display apparatus according to claim 1, wherein in a case where the input video signal has predetermined brightness, as a light source control mode when an OSD is superimposed onto the video based on the input video signal and the video is displayed, an operation different from a light source control mode when the OSD is not superimposed onto the video based on the input video signal and the video is displayed is executed.

5. The projection video display apparatus according to claim 1, wherein the plurality of light sources is a plurality of light sources that respectively emit light with a plurality of colors independently, and wherein a light source control mode for each of the plurality of light sources by the controller includes a light source control mode having a lighting period in which the plurality of light sources lights the plurality of colors at the same time to light a color contained in the plurality of colors in a mixed color state.

6. The projection video display apparatus according to claim 1, wherein the plurality of light sources is a plurality of light sources that respectively emit light with a plurality of colors independently, and wherein a light source control mode for each of the plurality of light sources by the controller includes a light source control mode in which the plurality of light sources does not light colors contained in the plurality of colors in a mixed color state to light the color of each of the plurality of light sources in a time-division manner.

7. The projection video display apparatus according to claim 1, wherein the plurality of light sources is a plurality of light sources that respectively emit light of a plurality of colors containing at least red, green, and blue independently, and wherein the controller is configured to execute a control to make a relative rate of a lighting ratio per unit time for the light source with the green smaller than those for the light sources with the red and blue and reduce a current value of each of the light sources with the red and blue more greatly than a current value of the light source with the green in the black display light source control mode in a case where the input video signal is the black signal compared with the case where the input video signal is the white signal.

8. The projection video display apparatus according to claim 7, wherein a light source control mode for each of the plurality of light sources by the controller includes a plurality of light source control modes in each of which the input video signal changes in a multiple-step manner in accordance with brightness of the video from the case of the white signal to the case of the black signal, and wherein in the plurality of light source control modes of changing in the multiple-step manner, the controller is configured to execute, in a stepwise manner in accordance with brightness of the input video signal, a control to make a relative rate of a lighting ratio per unit time for the light source with the green smaller than those for the light sources with the red and blue and reduce a current value of each of the light sources with the red and blue more greatly than a current value of the light source with the green in the black display light source control mode.

9. The projection video display apparatus according to claim 5, wherein the plurality of light sources is a plurality of light sources that respectively emit light of a plurality of colors containing at least red, green, and blue independently, and wherein a light source control mode for each of the plurality of light sources by the controller includes a light source control mode having a lighting period in which the plurality of light sources containing the red, green, and blue lights two colors or three colors at the same time to light the two colors or the three colors in the mixed color state.

10. The projection video display apparatus according to claim 6, wherein the plurality of light sources is a plurality of light sources that respectively emit light with a plurality of colors containing at least red, green, and blue independently, and wherein a light source control mode for each of the plurality of light sources by the controller includes a light source control mode in which the plurality of light sources containing the red, green, and blue does not light in the mixed color state to light the respective colors in a time-division manner.

* * * * *

UNITED STATES PATENT AND TRADEMARK OFFICE
CERTIFICATE OF CORRECTION

| | |
|---|---|
| PATENT NO. | : 10,491,868 B2 |
| APPLICATION NO. | : 16/323184 |
| DATED | : November 26, 2019 |
| INVENTOR(S) | : Shuhei Kobayashi et al. |

Page 1 of 1

It is certified that error appears in the above-identified patent and that said Letters Patent is hereby corrected as shown below:

In the Claims

Column 22
Claim 1; Line 25: "alight" is deleted and -- a light -- is inserted.

Signed and Sealed this
Thirtieth Day of January, 2024

Katherine Kelly Vidal
*Director of the United States Patent and Trademark Office*